US011758554B2

(12) United States Patent
Pelletier et al.

(10) Patent No.: US 11,758,554 B2
(45) Date of Patent: Sep. 12, 2023

(54) METHODS, SYSTEMS, AND DEVICES FOR TRANSFERRING DATA WITH DIFFERENT RELIABILITIES

(71) Applicant: InterDigital Patent Holdings, Inc., Wilmington, DE (US)

(72) Inventors: Ghyslain Pelletier, Montréal (CA); Paul Marinier, Brossard (CA); Faris Alfarhan, Montréal (CA); Aata El Hamss, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 5 days.

(21) Appl. No.: 17/253,757

(22) PCT Filed: Jun. 19, 2019

(86) PCT No.: PCT/US2019/038017
§ 371 (c)(1),
(2) Date: Dec. 18, 2020

(87) PCT Pub. No.: WO2019/246285
PCT Pub. Date: Dec. 26, 2019

(65) Prior Publication Data
US 2021/0266953 A1    Aug. 26, 2021

Related U.S. Application Data

(60) Provisional application No. 62/779,271, filed on Dec. 13, 2018, provisional application No. 62/752,807, (Continued)

(51) Int. Cl.
*H04W 72/04* (2009.01)
*H04W 72/12* (2009.01)
(Continued)

(52) U.S. Cl.
CPC ......... *H04W 72/23* (2023.01); *H04W 72/569* (2023.01)

(58) Field of Classification Search
None
See application file for complete search history.

(56) References Cited

U.S. PATENT DOCUMENTS 8,687,508 B2    4/2014  Marinier et al.
2010/0284364 A1*  11/2010  You ...................... H04L 1/1887
                                                                370/330
(Continued)

FOREIGN PATENT DOCUMENTS

GB    2572453 A1    10/2019
JP    2011142638 A    7/2011
(Continued)

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
(Continued)

*Primary Examiner* — Sai Aung
(74) *Attorney, Agent, or Firm* — Flaster Greenberg, P.C.

(57) ABSTRACT

Systems, methods, and devices for transferring data with different reliabilities. A wireless transmit/receive unit (WTRU) is configured with a first modulation and coding set (MCS) table and a second MCS table. The WTRU monitors for a radio network temporary identifier (RNTI). If the WTRU detects a first value for the RNTI, data is transferred with a first reliability. If the WTRU detects a second value for the RNTI, data is transferred with a second reliability.

20 Claims, 10 Drawing Sheets

Related U.S. Application Data filed on Oct. 30, 2018, provisional application No. 62/687,085, filed on Jun. 19, 2018.

(51) Int. Cl.
  *H04W 72/23* (2023.01)
  *H04W 72/566* (2023.01)

(56) References Cited

U.S. PATENT DOCUMENTS

| | | | |
|---|---|---|---|
| 2011/0170495 A1 | 7/2011 | Earnshaw et al. | |
| 2011/0268045 A1* | 11/2011 | Heo | H04L 5/001 370/329 |
| 2011/0310986 A1* | 12/2011 | Heo | H04L 5/0055 375/259 |
| 2012/0092999 A1* | 4/2012 | Chen | H04W 24/02 370/315 |
| 2014/0056278 A1* | 2/2014 | Marinier | H04W 72/044 370/330 |
| 2014/0307597 A1* | 10/2014 | Kim | H04L 5/1469 370/280 |
| 2016/0262182 A1* | 9/2016 | Yang | H04W 72/04 |
| 2017/0013565 A1* | 1/2017 | Pelletier | H04W 52/367 |
| 2017/0111891 A1* | 4/2017 | He | H04W 52/146 |
| 2018/0324867 A1* | 11/2018 | Basu Mallick | H04W 72/1242 |
| 2019/0159140 A1* | 5/2019 | Wang | H04W 52/367 |
| 2019/0357178 A1* | 11/2019 | Bae | H04L 5/0094 |
| 2019/0364449 A1* | 11/2019 | Yang | H04W 72/0446 |
| 2020/0196343 A1* | 6/2020 | Marinier | H04L 1/1896 |

FOREIGN PATENT DOCUMENTS

| | | |
|---|---|---|
| RU | 2421919 C2 | 6/2011 |
| WO | 2011/003180 A1 | 1/2011 |
| WO | 2015/116866 | 8/2015 |
| WO | 2016/096007 A1 | 6/2016 |
| WO | 2018/101874 A1 | 6/2018 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11 ah-2016 (Dec. 7, 2016).

Interdigital Communications Inc., "On enhancements for overlapping PUSCHs," 3GPP TSG RAN WG1 #96bis, R1-1904885, Xi'an, China (Apr. 8-12, 2019).

Interdigital Communications Inc., "Processing Times for Intra-UE Prioritization/Multiplexing for UL Data-Data," 3GPP TSG-RAN WG2 Meeting #105bis, R2-1903556, Xi'an, China (Apr. 8-12, 2019).

Interdigital Communications, "Intra-UE Prioritization / Multiplexing for Scenarios 2-5," 3GPP TSG-RAN WG1 Ad-Hoc Meeting 1901, R1-1900767, Taipei, Taiwan (Jan. 21-25, 2019).

Interdigital Communications, "Processing Times for Intra-UE Prioritization/Multiplexing for UL Data-Data," 3GPP TSG-RAN WG2 Meeting #105, R2-1901461, Athens, Greece (Feb. 25-Mar. 1, 2019).

Interdigital, "Processing Times for Intra-UE Prioritization/ Multiplexing for UL Data-Data," 3GPP RAN WG2 Meeting #106, R2-1906408, Reno, USA (May 13-17, 2019).

Interdigital, "Resource Conflicts for Data-only Intra-UE Prioritization," 3GPP RAN WG2 Meeting #106, R2-1906407, Reno, USA (May 13-17, 2019).

Interdigital, "Retransmissions Aspects for UL Data-Data Intra-UE Prioritization," 3GPP TSG-RAN WG2 Meeting #105, R2-1901460, Athens, Greece (Feb. 25-Mar. 1, 2019).

Interdigital, "Scheduling aspects of UL intra-UE prioritization," 3GPP TSG-RAN WG2 Meeting #104, R2-1816778, Spokane, U.S.A (Nov. 12-16, 2018).

Interdigital, "Summary of [104#38][NR/IIOT] Intra UE prioritization UL Data Data (Interdigital)," 3GPP TSG-RAN WG2 Meeting #105, R2-1901458, Athens, Greece (Feb. 25-Mar. 1, 2019).

Interdigital, "Support for new RNTI in DL-SCH and UL-SCH data transfer procedure," 3GPP TSG RAN WG2 RAN2 AH1807, R1-1809609, Montréal, Canada (Jul. 2-6, 2018).

Interdigital, "TP on UL Data-Data Intra UE prioritization," 3GPP TSG-RAN WG2 Meeting #105, R2-1901459, Athens, Greece (Feb. 25-Mar. 1, 2019).

Interdigital, Inc., "HARQ Operation with Dynamic Scheduling of MCS Tables in NR," 3GPP TSG RAN WG2 RAN2 AH1807, R1-1809608, Montréal, Canada (Jul. 2-6, 2018).

Qualcomm Incorporated, "Revised SID on NR-based Access to Unlicensed Spectrum," 3GPP TSG RAN Meeting #77, RP-172021, Sapporo, Japan (Sep. 11-14, 2017).

Third Generation Partnership Project, "Technical Specification Group Radio Access Network; Study on Licensed-Assisted Access to Unlicensed Spectrum; (Release 13)," 3GPP TR 36.889 V13.0.0 (Jun. 2015).

Third Generation Partnership Project, "Technical Specification Group Radio Access Network; Evolved Universal Terrestrial Radio Access (E-UTRA); Physical layer procedures (Release 15)," 3GPP TS 36.213 V15.0.0 (Dec. 2017).

Third Generation Partnership Project, "Technical Specification Group Radio Access Network; Evolved Universal Terrestrial Radio Access (E-UTRA); Physical layer procedures (Release 15)," 3GPP TS 36.213 V15.1.0 (Mar. 2018).

Third Generation Partnership Project, "Technical Specification Group Radio Access Network; Evolved Universal Terrestrial Radio Access (E-UTRA); Physical layer procedures (Release 15)," 3GPP TS 36.213 V15.5.0 (Mar. 2019).

Vivo, "Discussion on handling UL multiplexing of transmissions with different reliability requirements," 3GPP TSG RAN WG1 Meeting #92, R1-1801550, Athens, Greece (Feb. 26-Mar. 2, 2018).

Vivo, "Summary of handling UL multiplexing of transmission with different reliability requirements," 3GPP TSG RAN WG1 Meeting #92, R1-1803359, Athens, Greece (Feb. 26-Mar. 2, 2018).

* cited by examiner

METHODS, SYSTEMS, AND DEVICES FOR TRANSFERRING DATA WITH DIFFERENT RELIABILITIES

CROSS-REFERENCE TO RELATED APPLICATIONS

This application is the U.S. National Stage, under 35 U.S.C. § 371, of International Application No. PCT/US2019/038017 filed Jun. 19, 2019, which claims the benefit of U.S. Provisional Application 62/687,085, filed Jun. 19, 2018, U.S. Provisional Application 62/752,807, filed on Oct. 30, 2018 and U.S. Provisional Application 62/779,271, filed on Dec. 13, 2018, the contents of which are incorporated herein by reference.

BACKGROUND

A new radio (NR) wireless transmit/receive unit (WTRU) can be configured by radio resource control (RRC) with an additional network temporary identifier (RNTI), separate from the cell radio network temporary identifier (C-RNTI).

SUMMARY

Some embodiments provide a method implemented in a wireless transmit/receive unit (WTRU) for uplink (UL) transmission. A first grant is received or configured for a first UL resource, and a second grant is received or configured for a second UL resource. The WTRU uses an UL resource to transmit uplink data and/or control information (e.g. SR signal, HARQ ACK/NACK information, a MAC CE). It is determined whether the first UL resource overlaps in time with the second UL resource. If the first UL resource overlaps in time with the second UL resource, a first available processing time is determined. If the first available processing time is greater than a first threshold, either the first UL resource or the second UL resource is designated as a prioritized UL resource, a single transmission and/or transport block (TB) is generated for the prioritized resource, and the single TB is transmitted on the prioritized resource.

In some embodiments, if the first available processing time is less than the first threshold, but a second available processing time is greater than a second threshold, either the first UL resource or the second UL resource is designated as a prioritized UL resource, a first TB and/or UL control information is generated for the first resource and a second TB and/or UL control information is generated for the second resource, the first transmission is initiated on the first UL resource, the second transmission is initiated on the second UL resource, and a preemption procedure is performed on the first transmission and the second transmission.

In some embodiments, if the second available processing time is less than the second threshold, either the first UL resource or the second UL resource is designated as a prioritized UL resource a TB and/or UL control information is generated for the overlapping resources, processing and transmission for the UL resource that is not prioritized is ceased, and the TB and/or UL control information is transmitted on the prioritized UL resource.

In some embodiments, the first available processing time includes a difference in time between the determination that the first UL resource overlaps in time with the second UL resource, and a start time of an earliest of all transmissions of the first UL resource and the second UL resource. In some embodiments, the second available processing time includes a difference in time between the determination that the first UL resource overlaps in time with the second UL resource, and a start of the overlap in time between the first UL resource and the second UL resource. In some embodiments, the WTRU determines whether the first UL resource and the second UL resource overlap in time based on scheduling information. In some embodiments, the scheduling information includes the first UL grant, the second UL grant, or a resource for transmission of UL control information. In some embodiments, the WTRU determines that the first UL resource and the second UL resource overlap in time on a condition that for both the first UL resource and the second UL resource, at least one logical channel with buffered data is allowed for initial transmission. In some embodiments, the WTRU determines that the first UL resource and the second UL resource overlap in time on a condition that a highest logical channel priority mapped to the first UL resource differs from a highest logical channel priority mapped to the second UL resource.

In some embodiments, the first threshold is based on a minimum amount of time needed to determine, by the WTRU, a priority of the first UL resource and a priority of the second UL resource. In some embodiments, the first threshold is based on a minimum amount of time needed to evaluate, by the WTRU, logical channel prioritization (LCP) restrictions for the first grant and for the second grant, and a logical channel of highest configured priority is mapped to the first grant and to the second grant. In some embodiments, the first threshold is based on a minimum amount of time needed to evaluate, by the WTRU, the logical channel of highest configured priority is mapped to the first UL resource according to configured logical channel prioritization (LCP) restrictions, and the logical channel that corresponds to (or that triggered) the UL control information mapped to the second UL resource. In some embodiments, the second threshold is based on a minimum amount of time needed to perform the preemption procedure, and determining priorities for each UL resource based on grant processing in the physical layer. In some embodiments, the preemption procedure includes preempting, by a physical layer, the first transmission or the second transmission based on a prioritization of the first UL resource or the second UL resource. In some embodiments, designating either the first UL resource or the second UL resource as a prioritized UL resource includes performing logical channel prioritization (LCP), evaluating the logical channel of the highest priority mapped to the UL resource, and/or evaluating the logical channel that channel that corresponds to (or that triggered) the UL control information mapped to the UL resource.

Some embodiments provide a wireless transmit/receive unit (WTRU) configured for uplink (UL) transmission. The WTRU includes receiver circuitry which receives a first grant for a first UL resource and a second grant for a second UL resource; and a processor coupled to the receiver circuitry which determines whether the first UL resource overlaps in time with the second UL resource. The processor determines a first available processing time if the first UL resource overlaps in time with the second UL resource. If the first available processing time is greater than a first threshold, the processor designates either the first UL resource or the second UL resource as a prioritized UL resource, generates a single transport block (TB) and/or UL control information for the prioritized resource, and transmits it on the prioritized resource with transmitter circuitry coupled to the processor.

In some embodiments, if the first available processing time is less than the first threshold, but a second available processing time is greater than a second threshold, the processor designates either the first UL resource or the second UL resource as a prioritized UL resource, generates a first TB and/or UL control information for the first resource and a second TB and/or UL control information for the second resource, initiates the first transmission on the first UL resource, initiates the second transmission on the second UL resource, and performs a preemption procedure on the first transmission and the second transmission.

In some embodiments, if the second available processing time is less than the second threshold, the processor designates either the first UL resource or the second UL resource as a prioritized UL resource, generates a TB and/or UL control information for the overlapping resources, ceases processing and transmission for the UL resource that is not prioritized, and transmits the TB and/or UL control information on the prioritized UL resource.

In some embodiments, the first available processing time includes a difference in time between the determination that the first UL resource overlaps in time with the second UL resource, and a start time of an earliest of all transmissions of the first UL resource and the second UL resource. In some embodiments, the second available processing time includes a difference in time between the determination that the first UL resource overlaps in time with the second UL resource, and a start of the overlap in time between the first UL resource and the second UL resource. In some embodiments, the processor is further configured to determine whether the first UL resource and the second UL resource overlap in time based on scheduling information. In some embodiments, the scheduling information includes the first UL grant, the second UL grant, or a resource for transmission of UL control information. In some embodiments, the processor is further configured to determine that the first UL resource and the second UL resource overlap in time on a condition that for both the first UL resource and the second UL resource, at least one logical channel with buffered data is allowed for initial transmission. In some embodiments, the processor is further configured to determine that the first UL resource and the second UL resource overlap in time on a condition that a highest logical channel priority mapped to the first UL resource differs from a highest logical channel priority mapped to the second UL resource.

In some embodiments, the first threshold is based on a minimum amount of time needed to determine, by the WTRU, a priority of the first UL resource and a priority of the second UL resource. In some embodiments, the first threshold is based on a minimum amount of time needed to evaluate, by the WTRU, logical channel prioritization (LCP) restrictions for the first grant and for the second grant, and the processor is further configured to map a logical channel of highest configured priority to the first grant and to the second grant. In some embodiments, the second threshold is based on a minimum amount of time needed to perform the preemption procedure, and the processor is further configured to determine priorities for each UL resource based on grant processing in the physical layer. In some embodiments, the preemption procedure includes preempting, by a physical layer, the first transmission or the second transmission based on a prioritization of the first UL resource or the second UL resource. In some embodiments, designating either the first UL resource or the second UL resource as a prioritized UL resource includes performing logical channel prioritization (LCP), evaluating the logical channel of the highest priority mapped to the UL resource, and/or evaluating the logical channel that channel that corresponds to (or that triggered) the UL control information mapped to the UL resource.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
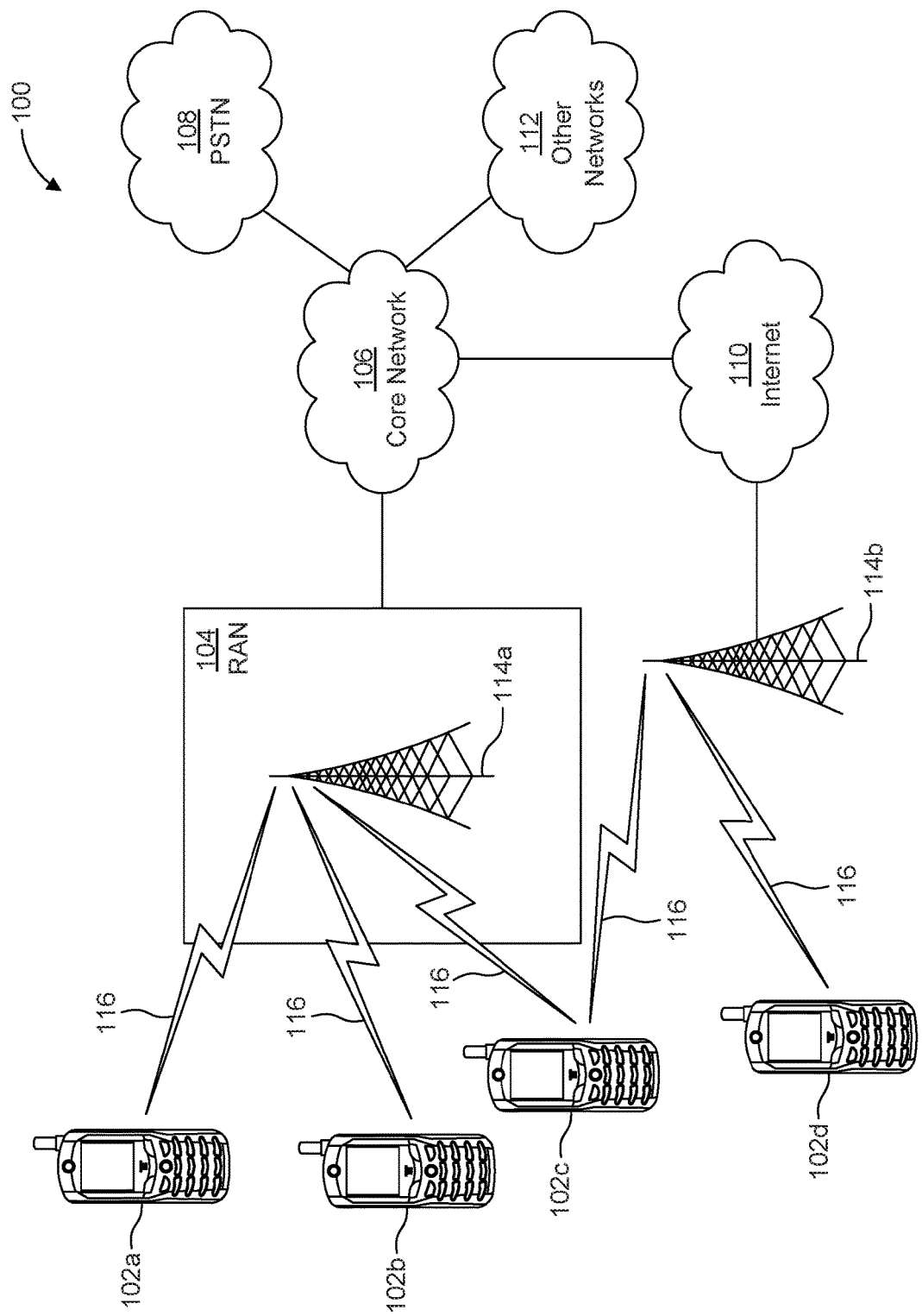
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi)), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
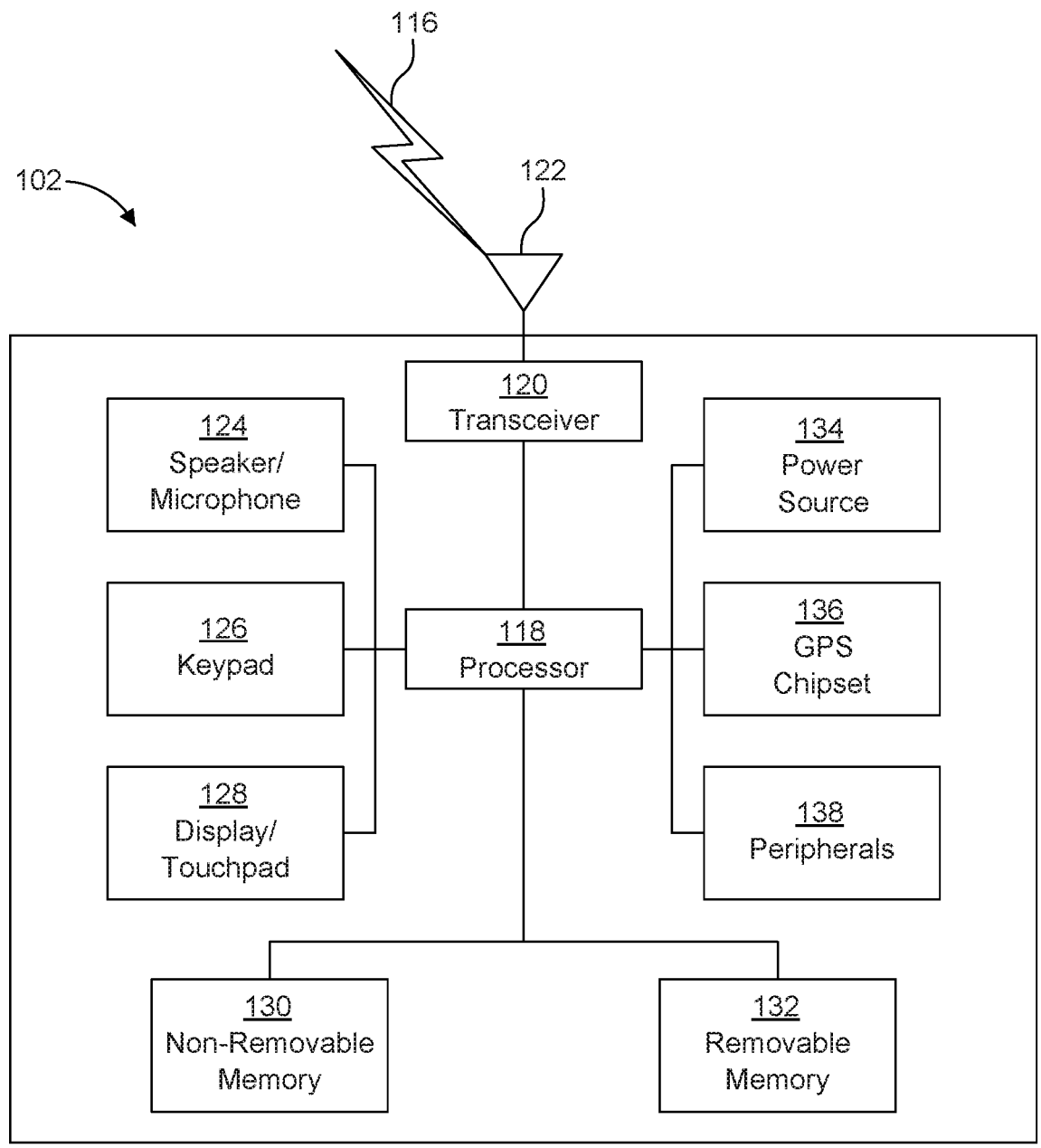
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
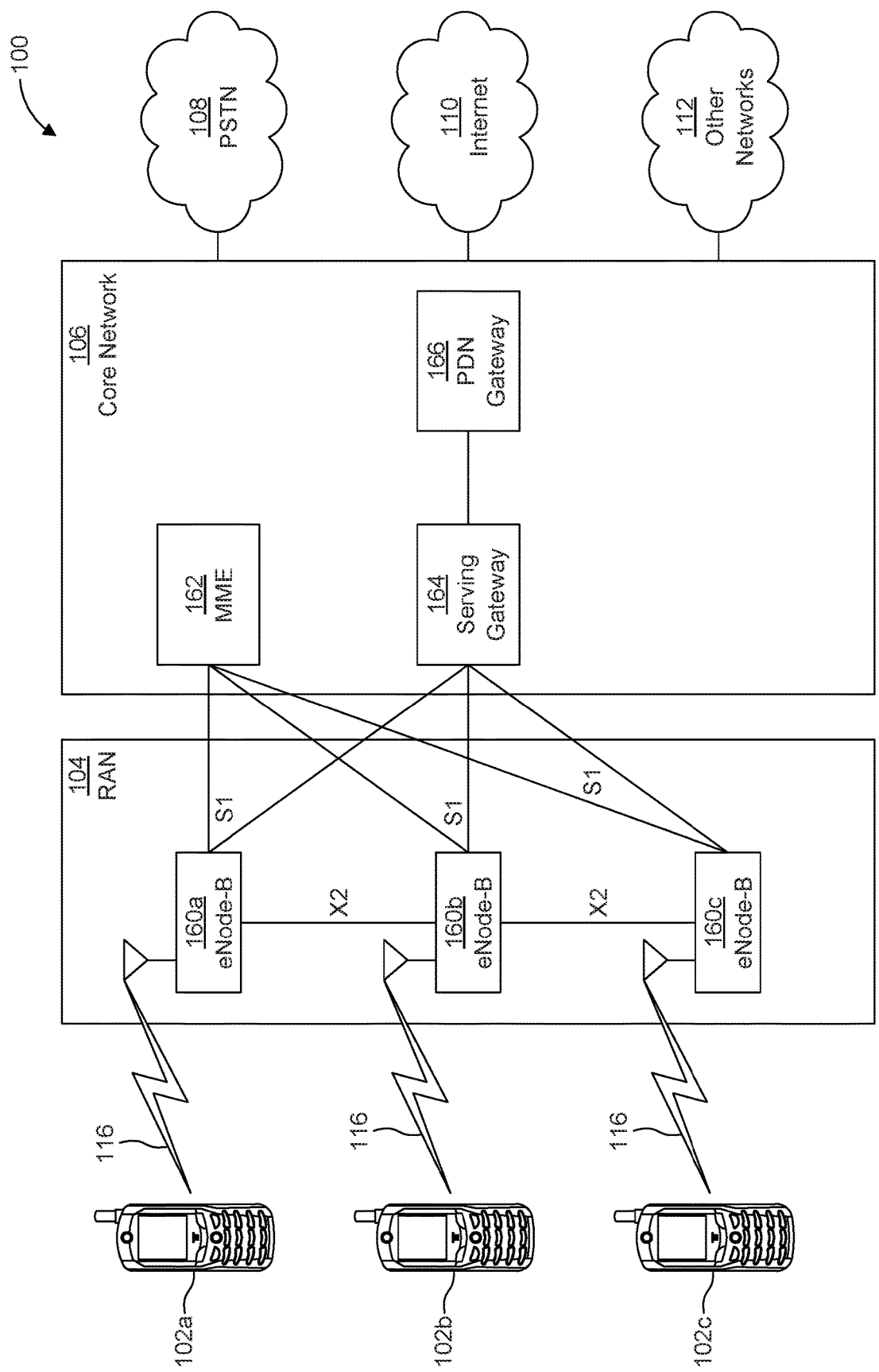
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network. In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
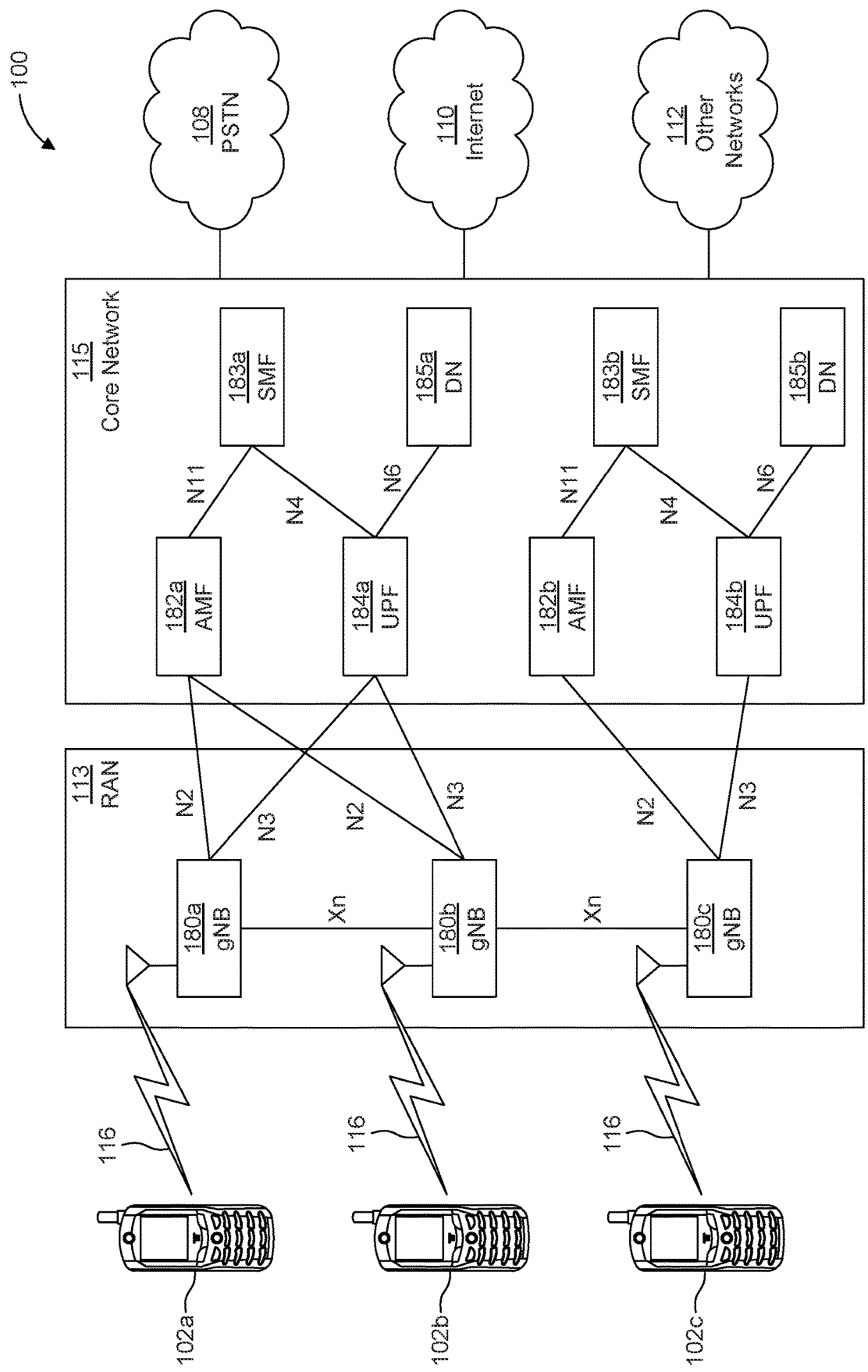
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A NR WTRU can be configured by RRC with a first and a second MCS table; e.g., where each table may be indicated as applicable to a transmission by a first and a second radio network temporary identifier (RNTI) respectively, or by a Downlink Control Information (DCI) message in a first Physical Downlink Control Channel (PDCCH) Search Space (SS) (e.g., a cell common SS), or in a second PDCCH SS (e.g., a WTRU-specific SS).

For grant-based transmissions, a downlink control information (DCI) cyclic redundancy check (CRC) can be scrambled by this additional RNTI to indicate the new MCS table. In some implementations, the network may indicate the new MCS table dynamically, even if the new RNTI is not configured, whereby DCIs sent in user search space (USS) use the new MCS table and DCIs sent in common search space (CSS) use the existing MCS tables. For configured grants, RRC may provide the new RNTI part of the configured grant resource configuration.

A NR WTRU can be configured with an additional RNTI that has characteristics similar to that of the C-RNTI. For example, the new RNTI may also uniquely identify the WTRU. The new RNTI and the C-RNTI may each indicate one of a plurality of MCS tables, to be used for a transmission scheduled by the DCI. Different MCS tables may correspond to different reliability and/or block error rate (BLER) targets. Alternatively, the WTRU may determine which MCS table to use for a transmission scheduled by a given DCI from the location of the DCI in the PDCCH search space of the WTRU. For example, the WTRU may determine that a DCI received in the WTRU-specific Search Space (UESS) corresponds to a second MCS table, while a DCI received in the Common Search Space (CSS) corresponds to a first (or a default) MCS table. The WTRU may receive the second RNTI in the configuration of the transmission resource for a configured grant.

In some implementations, a transport Block (TB) is used for UL transmissions. In LTE and in NR, the network (e.g., the eNB or gNB) may grant radio resources to a WTRU for a transmission on the UL shared channel (UL-SCH). The WTRU may receive such resource allocation either in a grant received on the Physical Downlink Control CHannel (PDCCH) or in a configured resource (e.g., a Semi-Persistently Scheduled UL grant in LTE, or a type-1 grant or a type-2 grant in NR). In some implementations, after receiving the resource allocation, the Medium Access Control (hereafter MAC) layer of the WTRU may provide the Hybrid Automatic Repeat reQuest (HARQ) entity (WTRU) with the necessary information for the UL transmission. This information may include one or more of a New Data Indication (NDI), a transmission unit, a Redundancy Version (RV), or a transmission duration. The NDI may indicate whether or not the uplink transmission should be a new transmission or a retransmission. The transmission unit (e.g., a Transport Block (TB) Size) may indicate the number of bits available for the uplink transmission. The UL HARQ information provided by MAC for the UL transmission indicates the transmission duration (TTI).

In a typical single carrier system, there may be at most a single TB of a given transmission duration at any given time. The HARQ entity may identify the HARQ process for which the transmission should take place. The HARQ entity also may provide HARQ feedback and Modulation and Coding Scheme (MCS) to the HARQ process.

The values of the NDI, TB size, RV TTI, and MCS may be controlled by the network (e.g., the eNB or gNB) and may be selected by the network to meet Quality of Service (QoS) requirements, such as a Packet Delay Budget (PDB), Packet Error Loss Rate (PELR) and/or corresponding radio Block Error Rate (BLER) target of the different radio bearers established for the WTRU, e.g., based on Buffer Status Reporting (BSR) information, reported Channel Quality Indications (CQI) and/or HARQ feedback, received from the WTRU.

To assemble a MAC Protocol Data Unit (PDU) for transmission, the WTRU may multiplex one or more MAC Service Data Units (SDU) from one or more logical channels (LCH) onto the TB to be delivered to the physical layer on the proper transport channel. For such multiplexing there may also be restrictions on the mapping between data from a LCH and a given TB. Examples restrictions include restrictions based on one or more characteristics of the transmission of the TB. Example characteristics may include the SCS, the maximum PUSCH transmission duration (e.g., the maximum TTI), the type of configured grant (e.g., NR type 1, type 2), and/or the serving cell or cells allowed for transmission of the data for a LCH.

As discussed herein, a Logical Channel (LCH) may represent a logical association between data packets and/or PDUs. Such association may be based on data units being associated to the same bearer. As discussed herein, a Logical Channel Group (LCG) may include a group of LCH(s) (or equivalent as per the definition above), where such grouping is based on one or more criteria. Example grouping criteria may include, for example, that the one or more LCH(s) in the group have a similar priority level as other LCHs of the same LCG, or are associated with the same type of transmissions in some way (e.g., having the same SCS, duration, waveform, etc.).

In some implementations, logical channel prioritization (LCP) is used for UL transmissions. LCP is a mechanism used to associate data available for transmission with resources that are available for UL transmissions. Some implementations support multiplexing of different data, having different QoS requirements, within the same transport block. In some implementations, such multiplexing is supported where the multiplexing does not introduce a negative impact (e.g., in terms of latency or reliability) to the service which has the most stringent QoS requirement, and/or does not introduce unnecessary waste of system resources (e.g., by introducing spectral inefficiency by carrying high reliability traffic on resources configured for best effort traffic).

In some implementations, a WTRU assembles a MAC PDU (e.g., when filling a TB for the UL transmission) to serve data from one or more LCH(s) using the following principles. For example, the WTRU may perform LCP using up to two rounds of processing in some implementations.

In a first round of an example LCP implementation (or, expressed another way, steps 1 and 2), data from one or more LCHs are served, up to a prioritized bit rate (PBR), in decreasing priority order. Said another way, data can be served for an LCH, at most, up to the PBR. In some examples, the amount of data taken from a LCH for multiplexing to a TB in this round may be up to, at most, a value corresponding to a PBR, and the LCHs are served in a decreasing priority order.

The data that is served can exceed the available amount of data capacity for the LCH for transmission in a given TTI (i.e., the served data can exceed the "bucket" or traffic shaper for the amount of possible served data in a given TTI (e.g., the envelope)) that is typically used to avoid unnecessary RLC segmentation). Said another way, some implementations allow more than the maximum amount of data to be served, e.g., if doing so would contribute to avoiding segmentation of a PDU or packet by the WTRU being necessary.

In round 2 of the example LCP implementation (or, expressed another way, step 3), data from LCHs is served in strict decreasing priority order to fill remaining resources. In some examples, the remaining resources include any amount of data in excess of the PBR for the LCH.

In some implementations, for NR, RRC controls the LCP procedure by configuring mapping restrictions for each logical channel. Example restrictions include restrictions (e.g., allowedSCS-List) setting the allowed Subcarrier Spacing(s) for transmission; restrictions (e.g., maxPUSCH-Duration) setting a maximum PUSCH duration allowed for transmission; restrictions (e.g., configuredGrantType1Allowed) setting whether a Configured Grant Type 1 can be used for transmission and/or restrictions (e.g., allowedServingCells) setting the allowed cell or cells for transmission.

Some implementations provide for flexible mapping restrictions through the use of transmission profiles (TPs). A TP is a mapping restriction that can be indicated dynamically, or can be configured per-grant. From the network perspective, a TP may correspond to a scheduling strategy associated with the transmission of a TB. From the WTRU MAC perspective, for a new transmission, MAC may use the TP indicated by a gNB for a given UL grant to determine which LCH or LCHs to evaluate when constructing the transport block. The mapping procedure may be performed by the WTRU without requiring information regarding the underlying PHY layer characteristics of the grant or scheduling strategy from the gNB. In some implementations, TPs enable the scheduler to more flexibly and dynamically control the LCP logic. For example, in some implementations, TPs enable the gNB to assign a specific set of resources (e.g., using a specific numerology, transmission duration, or a combination of both) to a specific LCH (or LCG) (e.g., to a specific type of data traffic) such that a specific treatment may be applied to the physical layer transmission in terms of latency, reliability and/or QoS characteristics. In some implementations, the MAC entity multiplexes data only from an LCH or LCHs configured with a TP value matching the value associated with the UL grant.

In some implementations, the WTRU physical layer may determine the applicable TP. The determination may be made, e.g., based on reception of dynamic signaling on PDCCH that indicates the applicable TP (or, in some embodiments, the applicable LCH or LCG) for the transmission, or based on the values applicable to the grant in terms of the mapping restrictions. The WTRU may pass this information (e.g., as part of the grant information) to the MAC layer (e.g., for LCP). If the WTRU is also configured with at least one TP value per configured LCH, either explicitly (e.g., a TP value between [0-3]), by association with one of more values for configured mapping restrictions (e.g., allowedSCS value 0 and allowedServingCells value 0 corresponds to a specific TP value or similar), or otherwise using a default value for the TP (e.g., TP=0), the WTRU may determine what data from which LCH is appropriate for multiplexing in a given TB.

In some implementations, such flexible mapping restrictions can have the advantage of enabling the scheduler to prioritize services for issued UL grants differently, e.g., depending on numerology/TTI duration.

The introduction of a new RNTI (e.g., new-RNTI, MCS-C-RNTI, etc.) may enable dynamic selection of an MCS table to achieve a particular level of reliability. However, functions at the MAC sub-layer do not currently allow for differentiated treatment of traffic based on desired reliability level. Various examples discussed herein discuss example new RNTIs, such as new-RNTI, MCS-C-RNTI, a second C-RNTI, or other notation of a plurality of RNTIs. It is noted that this nomenclature is exemplary, and that the techniques discussed herein are applicable to multiple RNTI scenarios generally. For example, as discussed herein, the functionality of a C-RNTI and MCS-C-RNTI are similar, except for their correspondence to a different MCS table.

Some embodiments relate to the impact of an additional RNTI on MAC. Some such impacts may relate to random access. For example, a WTRU may be configured with a maximum number of preamble transmissions, a backoff value, or a power ramping step value for each configured MCS table and/or C-RNTI value. If the WTRU determines that a random access is uniquely associated with at most one MCS table and/or C-RNTI value while the WTRU's configuration for the serving cell where the preamble is transmitted includes more than one RNTI value for C-RNTI, the WTRU may determine the maximum number of preamble transmissions for the procedure as a function of the RNTI value. This may be useful, for example, if the random access procedure is initiated as a function of the QoS requirement (e.g., latency) of a service (e.g., URLLC, or eMBB) to dynamically determine a maximum number of attempts before initiating a recovery procedure if the random access procedure does not complete successfully. The determined maximum number of attempts may be a function of the logical channel (LCH) mapping restrictions, the data, and/or the LCH that may have triggered the random access, and/or the C-RNTI of a DCI that triggers a random access (e.g., by PDCCH order). The QoS used to determine the RA parameters may be determined from the C-RNTI used to scramble the PDCCH that ordered the RA (i.e., contention-free RA by PDCCH-order). In some cases, the WTRU may be configured beam failure recovery related parameters, with one value of the beam failure recovery related parameter or parameters per MCS table and/or C-RNTI value. Such parameters may include any one or more of the following:

A maximum count for beam failure detection. This count may be referred to as beam FailureInstanceMaxCount herein, for example.

A timer for beam failure detection. This timer is referred to as beamFailureDetectionTimer herein, for example.

an RSRP threshold for beam failure recovery. This threshold is referred to as beamFailureCandidateBeamThreshold herein, for example.

A preamble power ramping step for beam failure recovery. This preamble power ramping step is referred to as preamblePowerRampingStep herein, for example.

A preamble received target power for beam failure recovery. This received target power is referred to as preambleReceivedTargetPower herein, for example.

A preamble transmission maximum for beam failure recovery. This maximum is referred to as preambleTxMax herein, for example.

A time window to monitor response(s) for the beam failure recovery using contention-free Random Access Preamble. This time window is referred to as ra-ResponseWindow herein, for example.

The WTRU may be configured with one or more beam failure recovery configurations for each configured MCS table and/or C-RNTI value. These failure recovery configurations are referred to as BeamFailureRecoveryConfig herein, for example. Differentiated parameters based on RNTI value may be used to dynamically adapt between different sets of parameters for the beam failure recovery procedure (for example, as a function of the expected speed and/or reliability of the recovery). For example, the WTRU may select the BeamFailureRecoveryConfig associated with the MCS table used to transmit the beam failure recovery request, or the WTRU may select the BeamFailureRecoveryConfig associated with high reliability if it is configured with a second C-RNTI.

For beam-failure recovery (BFR), the WTRU may perform a contention-free random access (CFRA) by transmitting a preamble, and after transmitting the preamble, monitoring the PDCCH of the serving cell (e.g., a special cell (SpCell), such as a primary cell (PCell) of the master cell group (MCG) or PCell of the secondary cell group (SCG)) for a response to the BFR request identified by C-RNTI. If the WTRU is configured with more than one C-RNTI value (e.g., more than one value per serving cell), the WTRU may monitor C-RNTI using all configured RNTI values for a transmission addressed to C-RNTI, or the WTRU may monitor C-RNTI using a single RNTI value.

In cases where the WTRU monitors C-RNTI using all configured RNTI values for a transmission addressed to C-RNTI, the WTRU may consider the random access procedure successful for BFR if it receives a PDCCH transmission addressed to the C-RNTI using either value before a ra-Response Window configured in BeamFailureRecoveryConfig has expired. Otherwise, the WTRU may consider the Random Access Reception as not successful. In some cases, the WTRU may determine additional information as a function of the RNTI value of the C-RNTI. For example, the WTRU may determine a first aspect if the DCI on PDCCH is received using a first RNTI value. In another example, the WTRU may determine a second aspect if the DCI on PDCCH is received using a second RNTI value.

In cases where the WTRU monitors C-RNTI using a single RNTI value, the WTRU may use a single value applicable to the BFR procedure. Such value may correspond to a default MCS table (e.g., corresponding to an eMBB service) or may correspond to another MCS table (e.g., corresponding to a URLLC service). In some cases, which value the WTRU monitors may be a configuration aspect of the WTRU. In some cases, the WTRU may consider the random access procedure successful for BFR if it receives a PDCCH transmission addressed to the applicable C-RNTI value before the ra-Response Window configured in BeamFailureRecoveryConfig has expired; otherwise, the WTRU may consider the Random Access Reception to be not successful. In some cases, the WTRU may receive a PDCCH transmission addressed using a configured RNTI value other than the RNTI value that is applicable to the ongoing BFR procedure for the C-RNTI. The WTRU may determine that the corresponding beam may no longer be used, may stop using the corresponding beam, and may initiate the establishment of a different beam. In this case, the WTRU may consider the random access procedure completed, and may consider the random access procedure successful. For example, in this case, the WTRU may not transmit further preambles for the current instance of the procedure and/or may not indicate radio link problems to upper layers, and the WTRU may determine that the beam failure recovery has completed.

For general contention-based random access (including when it is used for BFR), if the WTRU is configured with more than one value for C-RNTI (e.g., more than one value per serving cell), the WTRU may determine that contention resolution is successful if it receives a C-RNTI with any configured RNTI value while the ra-ContentionResolutionTimer is running, or the WTRU may determine that contention resolution is successful if it receives a C-RNTI with one specific RNTI value while the ra-ContentionResolutionTimer is running.

In some cases where the WTRU determines that contention resolution is successful if it receives a C-RNTI with either RNTI value while the ra-ContentionResolutionTimer is running, the WTRU may determine that contention resolution is successful only if the WTRU did not include a C-RNTI MAC CE in Msg3 for the concerned procedure; otherwise, the WTRU may consider the Random Access Reception not successful. In such cases, the WTRU may determine additional information as a function of the RNTI value of the C-RNTI. For example, the WTRU may determine a first aspect if the DCI on PDCCH is received using a first RNTI value, or the WTRU may determine a second aspect if the DCI on PDCCH is received using a second RNTI value, or both.

In some cases where the WTRU determines that contention resolution is successful if it receives a C-RNTI with one specific RNTI value while the ra-ContentionResolutionTimer is running, the WTRU may use a single value applicable for contention resolution for the contention-based random access procedure. Such value may correspond to a default MCS table (e.g., corresponding to eMBB service) or may correspond to another MCS table (e.g., corresponding to a URLLC service). In some cases, the value that the WTRU monitors may be a configuration aspect of the WTRU. In some cases, the value may correspond to the RNTI included in the C-RNTI MAC CE if it was included in message 3 of the random access procedure (Msg3). For example, if the CBRA procedure (RA-SR) was initiated following a trigger for a scheduling request (SR), the WTRU may include in the C-RNTI MAC CE the RNTI value as a function of the data that triggered the SR. For example, a LCH may be configured such that it is associated with a MCS table (or more generally, to a TP) for example, as part of the LCH mapping restrictions. In such cases, the WTRU may include the RNTI value corresponding to the associated MCS table in the C-RNTI MAC CE, for example, if the MCS table is itself associated with a specific RNTI value. The WTRU may thereafter use the RNTI value included in the C-RNTI MAC CE to perform contention resolution.

In some cases where the WTRU determines that contention resolution is successful if it receives a C-RNTI with one specific RNTI value while the ra-ContentionResolutionTimer is running, the WTRU may consider the contention resolution successful for the random access when it receives a PDCCH transmission addressed to the applicable C-RNTI value before the ra-ContentionResolutionTimer has expired, otherwise, the WTRU may consider the contention resolution unsuccessful. For BFR, the WTRU may receive a PDCCH transmission addressed using a configured RNTI value other than the RNTI value that is applicable to the ongoing BFR procedure for the C-RNTI, and the WTRU may determine that the contention resolution was unsuccessful. In this case, the WTRU may determine that the random access procedure for the BFR has been unsuccessful when the ra-ContentionResolutionTimer has expired.

In some cases, the WTRU may ignore the PDCCH received with the configured RNTI value other than the RNTI value that is applicable to the ongoing BFR procedure for the C-RNTI. In some cases, the WTRU may receive a PDCCH transmission addressed using a configured RNTI value other than the RNTI value that is applicable to the ongoing BFR procedure for the C-RNTI. In some cases, the WTRU may determine that the contention resolution is unsuccessful. In some cases, the WTRU may ignore the PDCCH received with the configured RNTI value other than the RNTI value that is applicable to the ongoing random access procedure for the C-RNTI. In some cases, the temporary C-RNTI received in the RAR message always corresponds to the RNTI value associated with the default MCS table.

For the MAC C-RNTI CE, in some examples, if the WTRU is configured with more than one value for C-RNTI (e.g., more than one value per serving cell), the WTRU shall include in the C-RNTI MAC CE (e.g., for Msg3 of the random access procedure) the RNTI value for C-RNTI that corresponds to at least one of the following four values. First, the included RNTI value may correspond to a default RNTI value, for example, to a default MCS table. Second, the included RNTI value may correspond to a C-RNTI value for which the WTRU has successfully decoded a DCI instructing the WTRU to initiate a random access procedure (e.g., the C-RNTI of the DCI received for a PDCCH order to perform a random access procedure). Third, the included RNTI value may be selected as a function of a trigger for the random access procedure. For example, for RA-SR (e.g., triggered by data becoming available for transmissions), the RNTI value may correspond to the LCH of the data that triggered the RA-SR as a function of the LCH restrictions. Such LCH restriction may include an MCS value, or the associated MCS table. In such cases, the WTRU may include the RNTI value corresponding to the associated MCS table for LCH restriction in the C-RNTI MAC CE (e.g., if the MCS table is itself associated with a specific RNTI value). Fourth, for a format that supports one or more RNTI values, the included RNTI value may correspond to a LCH for which there is data available for transmission, similar to the previous example related to the LCH that led to the initiation of the random access procedure, for a format that support one or more RNTI values.

Some embodiments relate to HARQ operation. For example, in cases where a WTRU is configured with more than one value for C-RNTI per serving cell, the WTRU may be configured with one value per C-RNTI for one or more parameters associated with the HARQ entity. Such parameters may include, for example, a maximum number of HARQ retransmissions for a HARQ process and/or for a transport block.

A WTRU configured with more than one value for C-RNTI per serving cell may receive a DCI on PDCCH to one of the MAC entity's C-RNTIs for the serving cell (e.g., the DCI is at least partially scrambled by the C-RNTI). In some embodiments, the WTRU may consider the new data indicator (NDI) to have been toggled (e.g., the DCI indicates a transmission of a new transport block) for the HARQ process indicated in the DCI if the DCI contains a downlink assignment or a UL grant, for example, if the DCI schedules the first transmission for the concerned C-RNTI value; if the DCI schedules a HARQ process (e.g., based on the HARQ process identity) that was last scheduled using a different C-RNTI value; if the DCI schedules a HARQ process (e.g., based on the HARQ process identity) that was last scheduled using a different C-RNTI value but the MCS or MCS table of the retransmission is different than the one used when this process was last scheduled for this HARQ process; if the DCI schedules a HARQ process (e.g., based on the HARQ process identity) that was last scheduled using a different C-RNTI value but the parameters of the transmission (e.g., the MCS or MCS table) do not match the LCH restrictions of the data that is associated to the last transmission for this HARQ process; if the DCI schedules a HARQ process (e.g., based on the HARQ process identity) that was last scheduled using the same C-RNTI value but the scheduled transport block size is different than the size that was last scheduled for this HARQ process; or if the NDI flag in the DCI indicates that the NDI has been toggled; for example.

In some examples, downlink assignments received on the PDCCH both indicate that there is a transmission on a DL-SCH for a particular MAC entity and provide the relevant HARQ information. When the MAC entity has a C-RNTI, MCS-C-RNTI, Temporary C-RNTI, or CS-RNTI, the MAC entity shall for each PDCCH occasion during which it monitors PDCCH and for each Serving Cell: if a downlink assignment for this PDCCH occasion and this Serving Cell has been received on the PDCCH for the MAC entity's C-RNTI, MCS-C-RNTI or Temporary C RNTI: indicate the presence of a downlink assignment and deliver the associated HARQ information to the HARQ entity; if this is the first downlink assignment for this Temporary C-RNTI: consider the NDI to have been toggled; if the downlink assignment is for the MAC entity's C-RNTI, and if the previous downlink assignment indicated to the HARQ entity of the same HARQ process was either a downlink assignment received for the MAC entity's CS-RNTI or MCS-C-RNTI or a configured downlink assignment: consider the NDI to have been toggled regardless of the value of the NDI; If the downlink assignment is for the MAC entity's MCS-C-RNTI, and if the previous downlink assignment indicated to the HARQ entity of the same HARQ process was either a downlink assignment received for the MAC entity's CS-RNTI or C-RNTI, or a configured downlink assignment: consider the NDI to have been toggled regardless of the value of the NDI.

In some examples, uplink grant is either received dynamically on the PDCCH, in a Random Access Response, or configured semi-persistently by RRC. The MAC entity shall have an uplink grant to transmit on the UL-SCH. To perform the requested transmissions, the MAC layer receives HARQ information from lower layers. If the MAC entity has a C-RNTI, a Temporary C-RNTI, a MCS-C-RNTI, or CS-RNTI, the MAC entity shall for each PDCCH occasion and for each Serving Cell belonging to a TAG that has a running timeAlignmentTimer and for each grant received for this PDCCH occasion: if an uplink grant for this Serving Cell has been received on the PDCCH for the MAC entity's C-RNTI, MCS-C-RNTI or Temporary C-RNTI, or if an uplink grant has been received in a Random Access Response: deliver the uplink grant and the associated HARQ information to the HARQ entity; if the uplink grant is for MAC entity's C-RNTI and if the previous uplink grant delivered to the HARQ entity for the same HARQ process was either an uplink grant received for the MAC entity's CS-RNTI or MCS-C-RNTI or a configured uplink grant, or if the uplink grant is for the MAC entity's MCS-C-RNTI, and if the previous uplink grant delivered to the HARQ entity of the same HARQ process was either an uplink grant received for the MAC entity's CS-RNTI or C-RNTI, or a configured uplink grant: consider the NDI to have been toggled for the corresponding HARQ process regardless of the value of the NDI. If the uplink grant is for MAC entity's C-RNTI or MCS-C-RNTI, and the identified HARQ process is configured for a configured uplink grant: start or restart the configuredGrantTimer for the corresponding HARQ process, if configured.

In some examples, downlink assignments received on the PDCCH both indicate that there is a transmission on a DL-SCH for a particular MAC entity and provide the relevant HARQ information. When the MAC entity has a C-RNTI, MCS-C-RNTI, Temporary C-RNTI, or CS-RNTI, the MAC entity shall for each PDCCH occasion during which it monitors PDCCH and for each Serving Cell: if a downlink assignment for this PDCCH occasion and this Serving Cell has been received on the PDCCH for the MAC entity's C-RNTI, MCS-C-RNTI or Temporary C RNTI: indicate the presence of a downlink assignment and deliver the associated HARQ information to the HARQ entity; if this is the first downlink assignment for this Temporary C-RNTI, consider the NDI to have been toggled; if the downlink assignment is for the MAC entity's C-RNTI, and if the previous downlink assignment indicated to the HARQ entity of the same HARQ process was either a downlink assignment received for the MAC entity's CS-RNTI or MCS-C-RNTI or a configured downlink assignment, or if the downlink assignment is for the MAC entity's C-RNTI or MCS-C-RNTI, and if the previous downlink assignment indicated to the HARQ entity of the same HARQ process was a downlink assignment for a transmission using a different MCS table: consider the NDI to have been toggled regardless of the value of the NDI.

In some examples, uplink grant is either received dynamically on the PDCCH, in a Random Access Response, or configured semi-persistently by RRC. The MAC entity shall have an uplink grant to transmit on the UL-SCH. To perform the requested transmissions, the MAC layer receives HARQ information from lower layers. If the MAC entity has a C-RNTI, a Temporary C-RNTI, a MCS-C-RNTI, or CS-RNTI, the MAC entity shall for each PDCCH occasion and for each Serving Cell belonging to a TAG that has a running timeAlignmentTimer and for each grant received for this PDCCH occasion: if an uplink grant for this Serving Cell has been received on the PDCCH for the MAC entity's C-RNTI, MCS-C-RNTI or Temporary C-RNTI, or if an uplink grant has been received in a Random Access Response: deliver the uplink grant and the associated HARQ information to the HARQ entity; if the uplink grant is for MAC entity's C-RNTI and if the previous uplink grant delivered to the HARQ entity for the same HARQ process was either an uplink grant received for the MAC entity's CS-RNTI or MCS-C-RNTI or a configured uplink grant, or if the uplink grant is for the MAC entity's MCS-C-RNTI, and if the previous uplink grant delivered to the HARQ entity of the same HARQ process was an uplink grant for a transmission using a different MCS table: consider the NDI to have been toggled for the corresponding HARQ process regardless of the value of the NDI; if the uplink grant is for MAC entity's C-RNTI or MCS-C-RNTI, and the identified HARQ process is configured for a configured uplink grant: start or restart the configuredGrantTimer for the corresponding HARQ process, if configured.

A WTRU configured with more than one value for C-RNTI per serving cell may receive a DCI on PDCCH to one of the MAC entity's C-RNTI for the serving cell (e.g., the DCI is at least partially scrambled by the C-RNTI). In some examples, the WTRU may consider that the NDI has not been toggled (e.g., the DCI indicates a retransmission of transport block) for the HARQ process indicated in the DCI if the DCI contains a downlink assignment or a UL grant, for example, according to at least one of the following: where the DCI schedules a HARQ process (e.g., based on the HARQ process identity) that was last scheduled using a different C-RNTI value and the transport block size is the same size that was last scheduled for this HARQ process; where the DCI schedules a HARQ process (e.g., based on the HARQ process identity) that was last scheduled using a different C-RNTI value and the transport block size is the same size that was last scheduled for this HARQ process and the MCS or MCS table is the same as the one that was last scheduled for this HARQ process; or where the NDI flag in the DCI indicates that the NDI has not been toggled.

A WTRU configured with more than one value for C-RNTI per serving cell may receive a DCI on PDCCH to one of the MAC entity's C-RNTI for the serving cell (e.g., the DCI is at least partially scrambled by the C-RNTI). In some embodiments, the WTRU may determine that the DCI should be discarded (e.g., the WTRU does not perform transmission on the UL grant received on the DCI and/or reception on a DL assignment received on the DCI) if it determines, for example at least one of the following: that the DCI schedules a HARQ process (e.g., based on the HARQ process identity) that was last scheduled using a different C-RNTI value; that the DCI schedules a HARQ process (e.g., based on the HARQ process identity) that was last scheduled using a different C-RNTI value and the transport block size is different than the size that was last scheduled for this HARQ process; or that the DCI schedules a HARQ process (e.g., based on the HARQ process identity) that was last scheduled using a different C-RNTI value and the NDI field in the DCI indicates that the NDI has not been toggled. This case may correspond to an unexpected case; e.g., a network error or a PDCCH false positive detection.

In some examples, downlink assignments received on the PDCCH both indicate that there is a transmission on a DL-SCH for a particular MAC entity and provide the relevant HARQ information. When the MAC entity has a C-RNTI, MCS-C-RNTI, Temporary C-RNTI, or CS-RNTI, the MAC entity shall for each PDCCH occasion during which it monitors PDCCH and for each Serving Cell: if a downlink assignment for this PDCCH occasion and this Serving Cell has been received on the PDCCH for the MAC entity's C-RNTI, MCS-C-RNTI or Temporary C RNTI: if this is the first downlink assignment for this Temporary C-RNTI: consider the NDI to have been toggled; if the downlink assignment is for the MAC entity's C-RNTI or MCS-C-RNTI, and if the previous downlink assignment indicated to the HARQ entity of the same HARQ process was either a downlink assignment received for the MAC entity's CS-RNTI or a configured downlink assignment: consider the NDI to have been toggled regardless of the value of the NDI; if the downlink assignment is for the MAC entity's C-RNTI, and if the previous downlink assignment indicated to the HARQ entity of the same HARQ process was received for the MAC entity's MCS-C-RNTI, and if NDI has not been toggled, or if the downlink assignment is for the MAC entity's MCS-C-RNTI, and if the previous downlink assignment indicated to the HARQ entity of the same HARQ process was received for the MAC entity's C-RNTI, and if NDI has not been toggled: ignore the downlink assignment; else: indicate the presence of a downlink assignment and deliver the associated HARQ information to the HARQ entity.

In some examples, uplink grant is either received dynamically on the PDCCH, in a Random Access Response, or configured semi-persistently by RRC. The MAC entity shall have an uplink grant to transmit on the UL-SCH. To perform the requested transmissions, the MAC layer receives HARQ information from lower layers. If the MAC entity has a C-RNTI, a Temporary C-RNTI, a MCS-C-RNTI, or CS-RNTI, the MAC entity shall for each PDCCH occasion and for each Serving Cell belonging to a TAG that has a running timeAlignmentTimer and for each grant received for this PDCCH occasion: if an uplink grant for this Serving Cell has been received on the PDCCH for the MAC entity's C-RNTI, MCS-C-RNTI or Temporary C-RNTI, or if an uplink grant has been received in a Random Access Response: if the uplink grant is for MAC entity's C-RNTI or MCS-C-RNTI and if the previous uplink grant delivered to the HARQ entity for the same HARQ process was either an uplink grant received for the MAC entity's CS-RNTI or a configured uplink grant: consider the NDI to have been toggled for the corresponding HARQ process regardless of the value of the NDI; if the uplink grant is for MAC entity's C-RNTI or MCS-C-RNTI, and the identified HARQ process is configured for a configured uplink grant: start or restart the configuredGrantTimer for the corresponding HARQ process, if configured; if the uplink grant is for the MAC entity's C-RNTI, and if the previous uplink grant delivered to the HARQ entity of the same HARQ process was received on the MAC entity's MCS-C-RNTI, and if NDI has not been toggled, or if the uplink grant is for the MAC entity's MCS-C-RNTI, and if the previous uplink grant delivered to the HARQ entity of the same HARQ process was received on the MAC entity's C-RNTI, and if NDI has not been toggled: ignore the uplink grant; else: deliver the uplink grant and the associated HARQ information to the HARQ entity.

Some embodiments relate to logical channel prioritization. For example, in some embodiments, RRC may control the LCP procedure by configuring one or more mapping restrictions for each logical channel. The mapping restrictions can be indicated, for example, by a parameter configured for each logical channel that represents the MCS table, or a parameter that indicates a RNTI value for the C-RNTI. These example parameters are referred to herein as allowedMCS-Table and allowedRNTI-value respectively. In some embodiments, the WTRU may multiplex data scheduled using a specific MCS table and/or using a specific RNTI to a transport block only if the LCH is configured with a mapping restriction that allows data to be transmitted using the same values, or using a value that is within the range of allowed values.

In some embodiments, a mapping restriction, such as a maximum PUSCH duration or an allowed sub-carrier spacing, may depend on the type of MCS table indicated by the grant or the type of RNTI (e.g. C-RNTI or new-RNTI) used for the grant. For example, the maximum PUSCH duration could be configured to a first (e.g., higher) value for a first type of MCS table optimized for high-reliability, and to a second (e.g., lower) value for a second type of MCS table not optimized for high-reliability. This approach may leverage efficiencies due to a lower likelihood of retransmissions being required if a MCS table optimized for high-reliability is indicated.

In some embodiments, the WTRU may adapt the applicability of configured LCP mapping restrictions according to the applicable HARQ process ID. The WTRU may be configured by RRC with certain HARQ process IDs as exempt from all or a subset of LCP restrictions. The WTRU may be configured by RRC with certain LCH(s) as exempt from restrictions only on the exempt HARQ process IDs. The WTRU may not apply all or subset of restrictions configured for LCHs when constructing a TB for an UL grant for which a HARQ process ID is configured by RRC to be exempt from LCP restrictions. For example, the WTRU may receive an UL grant with a HARQ process ID configured as exempt from a subset of LCP LCH selection restrictions. The WTRU may construct a TB for the UL grant for a new transmission considering all LCHs with buffered data, or all LCHs not configured with restrictions plus LCHs configured as exempt from restrictions on the exempt HARQ process IDs.

In some embodiments, WTRU may receive a dynamic indication from the gNB to suspend or resume applying certain configured LCP restrictions. The WTRU may receive an LCP restriction applicability indication from the network to preform one of the following: suspend configured restrictions, apply new restrictions, or resume the application of configured restrictions. The WTRU may receive the applicability indication via explicit signaling or indication. For example, the WTRU may receive the applicability indication on DCI or MAC CE signaling. In another example, the WTRU may determine the applicability indication from the contents of UL HARQ information, a QoS flow marker, and/or a protocol subheader. The indication may be applicable only for a single packet, TB, or HARQ PID transmission.

The WTRU may determine the applicability indication implicitly, from example from the PDCCH resource (e.g. coreset, and/or search space), a property of the PDCCH resource (e.g. periodicity, monitoring pattern, duration, C-RNTI, and/or scrambling type), or a property of a DL transmission corresponding to the concerned UL transmission (e.g. reflective QoS indicator, and/or QFI). In one example, the WTRU may be specified or configured by RRC with certain C-RNTI(s) as exempt from restrictions, such that an UL grant scheduled on DCI and/or PDCCH scrambled by such C-RNTI(s) may be considered by the WTRU as exempt from LCP restrictions or a subset of LCP restrictions; the WTRU may not apply LCP restrictions (or subset of restrictions) configured for LCHs when constructing a TB for an UL grant scheduled on PDCCH scrambled by exempt C-RNTI(s). In another example, the WTRU may be specified or configured by RRC with certain coresets and/or search spaces as exempt from LCP restrictions, such that an UL grant scheduled on such PDCCH resources is considered by the WTRU as exempt from all or a subset of LCP restrictions; the WTRU may not apply LCP restrictions (or subset of restrictions) configured for LCHs when constructing a TB for an UL grant scheduled on PDCCH scrambled by C-RNTI(s) designated as exempt from LCP restrictions.

The applicability indication may also indicate (or be applicable for pre-configured) "indicated criteria" for which the LCP restriction suspension or resumption is applicable. The indicated criteria may include at least one of the following: (a) Logical channel(s): For example, the applicability indication may provide indication on the LCH or group of LCHs for which the restriction suspension or resumption is applicable. For example, the WTRU may suspend restrictions configured for a given LCH or LCG upon reception of the indication. In one realization, the WTRU may be configured by RRC with certain LCHs to be exempt from LCP restrictions upon reception of an applicability indication; (b) LCP restriction(s): For example, the applicability indication may provide indication on the LCP restriction(s) for which the suspension or resumption is applicable. For example, the WTRU may suspend a subset of LCP LCH selection restrictions (e.g. numerology, TTI duration restrictions, and/or configured grant type 1) upon reception of the indication. Indication may provide which restrictions are suspended. In one realization, the WTRU may be configured by RRC with certain LCP restrictions to be exempt from application in the LCP procedure upon reception of an applicability indication; (c) Resource type or index: WTRU suspends configured restrictions for a resource type (e.g. configured grant type1, type 2, and/or dynamic grant) upon reception of an applicability indication. For example, the WTRU may suspend configured restrictions for a given UL resource (or UL resource index) upon reception of the indication. The UL resource may be indicated by the applicability indication or preconfigured by higher layers. For example, the WTRU may be configured by RRC with certain UL resources types or resource indices; the WTRU may suspend configured restrictions for such UL resource(s) upon reception of the indication; (d) HARQ process ID(s): the WTRU may suspend or resume configured restrictions for TBs constructed for uplink transmissions on HARQ process IDs that are indicated by the applicability indication or preconfigured to be exempt upon reception of the indication. In one example, the WTRU may be configured by RRC with certain HARQ process IDs as exempt from LCP restrictions upon reception of the indication. The WTRU may suspend configured restrictions for a given UL resource upon reception of the indication if the determined HARQ process ID that is configured as exempt by RRC. The WTRU may determine the HARQ process ID directly form signaled UL HARQ information and/or from the selected resource (e.g. based on the resource type and the TTI); (e) Transport block size. For example, the WTRU may suspend LCP restrictions if the TBS is less than (or greater than) a certain threshold configured by RRC or indicated to the WTRU; (f) QoS parameter(s). For example, the WTRU may suspend or apply certain restrictions configured when the highest priority LCH mapped to the grant is above or below a certain threshold. In another example, the WTRU may suspend restrictions configured when data from a certain QoS flow or DRB is buffered.

WTRU may be configured with a suspension timer. When the suspension timer is running, the WTRU does not apply the LCP restrictions (or LCP restrictions for the indicated criteria). Upon timer expiry, the WTRU applies the configured LCP restrictions again. The WTRU may start the suspension timer upon reception of the LCP restriction applicability indication that indicates suspension of LCP restrictions. Timer may affect suspension of LCP restrictions on the indicated criteria, if the timer is started by reception of the LCP restriction applicability indication. The WTRU may start the suspension timer upon reception of a new packet, SDU, and/or buffered data from higher layers from a configured set of DRBs, LCHs, and/or QoS flows. The WTRU may start the timer upon transmitting (or triggering) an SR associated with a configured set of LCH(s) and/or SR configuration(s). The WTRU may start the timer upon triggering a BSR from a configured set of LCH(s). The WTRU may start the timer upon triggering an SR due to data arrival and the WTRU has no resource available that meets the configured LCP restrictions for the LCH that triggered the corresponding BSR. The suspension timer may be configured by RRC per WTRU, LCH, LCG, DRB, QoS flow, and/or uplink resource.

The WTRU may be configured with a restriction applicability timer. When the restriction applicability timer is running, the WTRU applies the configured LCP restrictions (or LCP restrictions for the indicated criteria). Upon expiry, the WTRU does not apply the configured LCP restrictions (or LCP restrictions for the indicated criteria). The WTRU may start the restriction applicability timer upon reception of the LCP restriction applicability indication that indicates resumption of LCP restrictions or addition of new LCP restriction(s). Timer may affect applicability of LCP restrictions on the indicated criteria, if the timer is started by reception of the LCP restriction applicability indication. The WTRU may start the restriction applicability timer upon reception of a new packet, SDU, and/or buffered data from higher layers from a configured set of DRBs, LCHs, and/or QoS flows. The WTRU may start the timer upon transmitting (or triggering) an SR associated with a configured set of LCH(s) and/or SR configuration(s). WTRU may start the timer upon triggering a BSR from a configured set of LCH(s). The restriction applicability timer may be configured by RRC per WTRU, LCH, LCG, DRB, QoS flow, and/or uplink resource.

Some embodiments relate to radio link failure. For example, a WTRU may be configured with more than one value for C-RNTI per serving cell. The WTRU may be configured to perform a different radio link recovery procedure as a function of the C-RNTI value used for scheduling. For example, if the transmission of a signal (e.g., data on PUSCH, preamble transmission) associated with a specific C-RNTI value leads to the initiation of a recovery procedure, a particular radio link recovery procedure associated with that C-RNTI may be performed. In some examples, the WTRU may determine a radio link recovery procedure to perform as a function of the RNTI value associated with ongoing HARQ processes, (e.g., HARQ processes for which the last transmission has not been positively acknowledged). For example, radio link problems may be detected from repeated failure (e.g., indicated by a NACK reception) of the transmission of a transport block associated with a first MCS Table and/or RNTI value for C-RNTI. In some embodiments, the WTRU may determine whether it should initiate an RRC connection re-establishment procedure if the transmission which caused radio link failure (RLF) was scheduled using a specific RNTI. The WTRU may determine that it should initiate the RRC connection re-establishment procedure if the HARQ process (or the last transmission of a HARQ process) has been scheduled using a first RNTI value (e.g., corresponding to eMBB service) or to initiate a conditional handover (e.g., by applying a pre-configured reconfiguration) otherwise (e.g., for URLLC service).

Some approaches relate to UL/DL Assignments. For example, regarding downlink assignment reception, A WTRU may monitor the PDCCH for each cell if it is configured with a second C-RNTI (also referred to, for example, as MCS-C-RNTI) to receive downlink assignments. It is noted that the term MCS-C-RNTI may be used interchangeably with the term new-RNTI.

In some embodiments, after receiving a downlink assignment, the WTRU may consider the NDI to be toggled regardless of the value indicated in the signaled NDI, if at least one of the following occurs: the WTRU receives a downlink assignment for its MCS-C-RNTI and the previous downlink assignment indicated the same HARQ process was for a different RNTI than the WTRU is configured with; the WTRU receives a downlink assignment for its MCS-C-RNTI and the previous downlink assignment indicated the same HARQ process for a configured downlink assignment; or the WTRU receives a downlink assignment for its C-RNTI and the previous downlink assignment indicated that the same HARQ process was for the MCS-C-RNTI of the WTRU.

The WTRU may also or instead determine whether to toggle the NDI based on whether the received downlink assignment overlaps with a previously received downlink assignment. The WTRU may also or instead determine whether to toggle the NDI based on the physical layer transmission characteristics of the current and previously received downlink assignments, including the PDSCH duration, the numerology, and/or the BLER of the MCSs indicated.

Regarding uplink grant reception, the WTRU may monitor the PDCCH for each cell if it is configured with a MCS-C-RNTI to receive an uplink grant or grants. In some examples, after receiving an uplink grant, the WTRU may toggle the NDI regardless of the value indicated in the signaled NDI, if one or more of the following occurs: the WTRU receives a uplink grant for its MCS-C-RNTI and the previous uplink grant indicated the same HARQ process was for a different RNTI than the WTRU is configured with; the WTRU receives a uplink grant for its MCS-C-RNTI and the previous uplink grant indicated the same HARQ process for a configured uplink grant; or the WTRU receives an uplink grant for its C-RNTI and the previous uplink grant indicated to the same HARQ process was for the WTRU's MCS-C-RNTI.

The WTRU may also or instead toggle the NDI based on whether the received uplink grant overlaps with a previously received uplink grant prior to toggling the NDI. The WTRU may also or instead toggle the NDI based on the physical layer transmission characteristics of the current and previously received uplink grants prior to toggling the NDI, including the PUSCH duration, the numerology, and/or the BLER of the MCSs indicated.

Regarding scheduling requests (SR), the WTRU may be configured with a scheduling request resource or configuration tied to a given MCS table. The WTRU may select a certain SR configuration depending on a logical channel configuration. For example, if a certain LCH is restricted in LCP to use a certain MCS table or tables, the WTRU may select certain associated SR configurations or resources associated with the allowed MCS table or tables for the LCH that triggered the SR.

Some approaches relate to configured grants or assignments. For example, in some embodiments, a configured grant may be associated with a type of MCS table. Such association may be signaled as part of RRC configuration. Alternatively, such association may be defined by physical layer signaling when the configured grant is activated. For example, the configured grant may be associated with a first type of MCS table if the PDCCH containing the activation command is received in a first search space (e.g., a WTRU-specific search space), or with a second type of MCS table if the PDCCH containing the activation command is received in a second search space (e.g., a common search space). In another example, the configured grant may be associated with a first type of MCS table if a first RNTI value (e.g., a new-RNTI) is used for the PDCCH containing the activation command, or with a second type of MCS table if a second RNTI (e.g., a C-RNTI) is used for the PDCCH containing the activation command.

In some embodiments, the type of and/or triggers for retransmissions or new transmissions with a configured grant may depend on the type of MCS table associated with this configured grant. Such examples, described in the following, enable different levels of reliability for traffic using different types of MCS tables.

In some embodiments, if a configured grant timer associated with a configured grant is running, the WTRU may perform a retransmission (e.g., a non-adaptive retransmission) using the configured grant if it is associated with a first type of MCS table, and not perform any retransmission if it is associated with a second type of MCS table. In some examples, for a configured grant associated with a first type of MCS table, the WTRU may stop an associated configured grant timer if it receives a certain type of physical layer signaling. The physical layer signaling may include a PDCCH using a first RNTI value (e.g., a new-RNTI) or a PDCCH received in a certain search space (e.g., a WTRU-specific search space), for example. These, or a combination of these approaches may allow the WTRU to retransmit a same transport block for every configured grant instance until reception of an indication from the network, for up to a duration corresponding to the configured grant timer value. This approach may have the advantage of increasing reliability.

In some examples, if a configured grant timer associated with a configured grant is not running, the WTRU may perform a retransmission (e.g., a non-adaptive retransmission) using the configured grant if the configured grant is associated with a first type of MCS table, and perform a new transmission (e.g., consider the NDI bit to have been toggled) if the configured grant is associated with a second type of MCS table.

A configured grant may overlap in time with a dynamic grant. In some examples, whether or not the dynamic grant takes precedence (i.e., overrides the configured grant), may depend on at least one of: the type of MCS table indicated by the dynamic grant; the type of RNTI (e.g., C-RNTI or new-RNTI) used to decode the dynamic grant; or the type of MCS table associated with the configured grant. For example, in some embodiments, the dynamic grant may take precedence over the configured grant only if the dynamic grant indicates a first type of MCS table (e.g., a type of MCS table optimized for reliability) or a first type of RNTI (e.g., a new-RNTI), or if the configured grant is associated with a second type of MCS table (e.g., a type of MCS table not optimized for reliability).

Some embodiments relate to handling of multiple sets of scheduling information (e.g., grants (e.g. PUSCH resource), DCI, resource for transmission of control information or signaling (e.g. PUCCH resource), etc. Grant is used herein as an exemplary SI.). For example, in some implementations, a WTRU may determine that one grant may overlap in time and/or resources with another grant. In some implementations, the WTRU may determine whether one set of scheduling information (e.g., a grant) overlaps in time and/or resources with those indicated in another grant. For example, the WTRU may determine that two grants overlap in time if new data arrives in the WTRU buffer or buffers and/or depending on the data priority and/or LCP mapping restrictions. The WTRU may carry out actions related to prioritization between the overlapping grants or generation of another TB accordingly. For example, if new data arrives in the WTRU buffer and a subset of the WTRU's buffered data maps to one of the overlapping grants but not both grants, the WTRU may carry out actions related to prioritization between the overlapping grants (e.g., may determine that one grant has a higher priority than the other, and allocate buffered data accordingly) or may generate another TB.

In some examples, a configured grant may overlap in time with a dynamic grant. In some examples, a configured grant may overlap both in time and in the set of PRBs with a dynamic grant.

In some examples, the WTRU may be configured with a grant for an uplink transmission. The WTRU may receive such configuration by L3 or RRC signaling. Such configuration may include time and/or frequency resources, and may include other transmission parameters, such as those typically associated with a grant. In some examples, a configured grant may be associated with at least one transmission profile (TP). In some examples, the WTRU configuration for multiplexing data for transmission in a transport block (TB) may include a mapping restriction to one or more TPs. Such mapping restriction may include an association between data of a logical channel (LCH) (or logical channel group (LCG), radio bearer (RB) or similar), and a specific TP.

In some examples, the WTRU may receive information about the applicable TP for a transmission in the grant information (e.g., in a DCI, or in a configuration of a grant). The WTRU may determine (e.g., as part of the Logical Prioritization Procedure (LCP)) the TP applicable to a TB associated with the transmission as signaled by the grant information, and may include data only from LCHs, LCGs and/or RBs for which the mapping restriction allows the concerned data to be transmitted using such TB.

The WTRU may be apprised that such configured grant is active e.g., based on reception of the signaling that configures the grant and/or from the reception of subsequent control signaling (e.g., a DCI) that activates the configured grant. In some examples, resources associated with the configured grant may correspond to the resources of a specific bandwidth part (BWP). In such cases, in some examples, the WTRU determines that the configured grant is active only if the WTRU determines that the concerned BWP (or BWPs) is also in an activated state for the WTRU. In some examples, the resources associated with the configured grant may correspond to the resources of a specific cell of the WTRU's configuration. In such cases, in some examples, the WTRU determines that the configured grant is active only if the WTRU determines that such concerned cell or cells are also in the activated state for the WTRU.

In some examples, the WTRU may receive dynamic scheduling information (e.g., a DCI on PDCCH) that indicates that the WTRU should perform a transmission. Such scheduling information may indicate that the resources (e.g., time and/or frequency resources) for such transmission at least partially overlap with a transmission indicated by an active configured grant, whereas the WTRU may only be able to perform a single transmission for the resources (e.g., where the WTRU cannot transmit the dynamic grant transmission and a configured grant transmission on the same resource simultaneously, e.g., where one transmission is intended for high-reliability).

In some embodiments, the WTRU selects grants that can carry data available for transmission which has the highest QoS requirements. For example, the WTRU may prioritize and/or determine that the grant information applicable to a transmission corresponding to the grant with the highest priority value (e.g. a TP value), and for which the WTRU has buffered data that can be transmitted under the grant's mapping restrictions (e.g. the grant's TP). The UE may determine the priority value of a grant as the highest priority logical channel with buffered data that can be mapped to it, taking into account the LCP LCH selection restrictions configured for each LCH. In another example, if the WTRU has no data available for transmission for any of the LCHs that apply to any grant in the set of overlapping grants, the grant information with the lowest priority (or lowest TP value) may be selected (e.g., for the transmission of padding information and/or of a buffer status report). In some examples, if the WTRU has no data available for transmission for any of the applicable TPs and/or grants, the WTRU may prioritize or select the grant information that was received by dynamic signaling (e.g. by DCI on PDCCH).

In some examples, the WTRU may perform such determination based on one or more parameters of the configured mapping restrictions for LCP (e.g., in the absence of an explicit indication for the TP in the scheduling information and/or in the WTRU's configuration for the configured grant and/or for the configured LCHs, LCGs or RBs). Stated another way, the WTRU may select the grant that may carry data associated to the logical channel with buffered data that has the highest priority, when two grants (e.g. a configured grant and a dynamically scheduled grant) are available for a transmission where at least one symbol is common in time to both grant information for their respective transmission durations.

In some examples, the WTRU may perform different procedures (e.g., a first selection procedure or a second selection procedure, examples of which are described below) to determine which grant, of the WTRU's current grants, to select as a function of the type of transmission resources (e.g., in terms of applicable MCS, MCS table, SCS, numerology, transmission duration, number of symbols or the like) and/or as a function of the type of overlap of the transmission resources (e.g., in terms of time and/or frequency).

In some examples, the WTRU always overrides an available grant (e.g., a currently active configured grant) based on a DCI if both grants are for the exact same resources/PRBs/data]. In some examples, the WTRU may perform a first selection procedure (e.g., according to the above) only if the grant information of all grants indicates something other than an exact overlap in time and in frequency (i.e., the grant information indicates that both transmissions would lead to a different use of resources in terms of physical resource blocks). Otherwise if the overlap is exact in terms of PRBs, the WTRU may deterministically (e.g., using a rule that does not change dynamically) select one of the grants (e.g., as a function of the way in which the WTRU acquired the grant information). For example, the WTRU may always select the dynamically scheduled grant. This may correspond to cases where the network dynamically adapts the transmission the WTRU would otherwise have performed using the configured grant (e.g., the network assigns a dynamic grant overlapping with a configured grant occasion to adapt the MCS or PHY reliability characteristics). In some examples, the WTRU may select the dynamically scheduled grant only if the TP and/or mapping restrictions for either grant would lead to the same data being selected for transmission (e.g., where both grants indicate that they are applicable to the transmission of the same data).

In some examples, the WTRU always overrides an available grant (e.g., a currently active configured grant) based on a DCI if both grants carry the same LCH mapping restrictions and/or TPs and/or QoS. In some examples, the WTRU may perform a second selection procedure (e.g., according to the above) only where the TP and/or resulting mapping restrictions in the grant information of both grants indicates that different data may be multiplexed on the transmission (e.g., where both grants indicate that they are applicable to the transmission of data from different LCHs, LCGs and/or RBs). Otherwise, if the same data may be transmitted using either grant, the WTRU may deterministically (e.g., using a rule that does not change dynamically) select one of the grants (e.g., as a function of the way in which the WTRU acquired the grant information—for example, the WTRU may always select the dynamically scheduled grant). For example, this may correspond to the case where the network dynamically adapts the transmission the WTRU would otherwise have performed using the configured grant (e.g., as above).

In some examples, the WTRU always overrides an available grant (e.g., a currently active configured grant) based on a DCI if both grants have similar PHY layer QoS. For example, (possibly in combination with one or more of the overrides above), the WTRU may deterministically (e.g., using a rule that does not change dynamically) select one of the grants (e.g., as a function of the way in which the WTRU acquired the grant information—for example, the WTRU may always select the dynamically scheduled grant when both grants indicate the use of the same MCS table, are of the same transmission duration, are of the same numerology and/or are of the same set of PRBs). In some examples, this may correspond to cases where the network dynamically adapts the transmission for a configured grant (e.g., as above).

In some examples, the WTRU considers data included in a particular TB to be retransmitted data. For example, in any of the above scenarios, in some implementations, if a grant is for a HARQ retransmission, the WTRU may consider the data included in the transport block (e.g., for which a retransmission is applicable) as part of the data available for transmission. In some examples, the WTRU may determine that a grant corresponding to an initial transmission is always prioritized over a grant corresponding to a retransmission.

Some embodiments relate to preemption. In some embodiments, preemption prioritizes one transmission over another, overlapping transmission. In some embodiments, a preempting transmission may interrupt an ongoing transmission. For example, the WTRU may determine that a transmission associated with each of two grants may be performed, at least in part, if the WTRU determines that one grant overlaps in time and/or resources another grant (a grant is used as an example of a set of scheduling information herein for convenience, however this applies generally to sets of scheduling information). For example, the WTRU (e.g., MAC) may generate one TB for each grant, initiate a first transmission, and subsequently apply physical layer preemption for the part of the transmissions that overlap with each other. In some examples, the WTRU may handle such multiple grants using physical layer preemption if the WTRU is configured to apply preemption to overlapping transmissions and/or if it is not possible to make the selection of one grant; e.g., due to insufficient processing resources or insufficient processing time. For example, such processing time (e.g. a first processing time) may correspond to the time between the reception of the second (e.g., later in time) grant and the time corresponding to the start of the earliest of the concerned overlapping transmissions, and the WTRU may apply preemption to overlapping transmissions if the processing time is insufficient (e.g. less than a configured threshold) to prioritize the transmissions in the MAC layer (e.g., using LCP). In some examples, such processing time may correspond to a capability of the WTRU (which capability may, e.g., be signaled to the network as part of a WTRU capability information exchange). In another example, the WTRU may apply preemption on condition that a second processing time is larger than a configured threshold, where such second processing time may correspond to the time between the reception of the second (e.g., later in time) grant and the time corresponding to the start of the resource overlap between the concerned overlapping transmissions.

Figure 2:
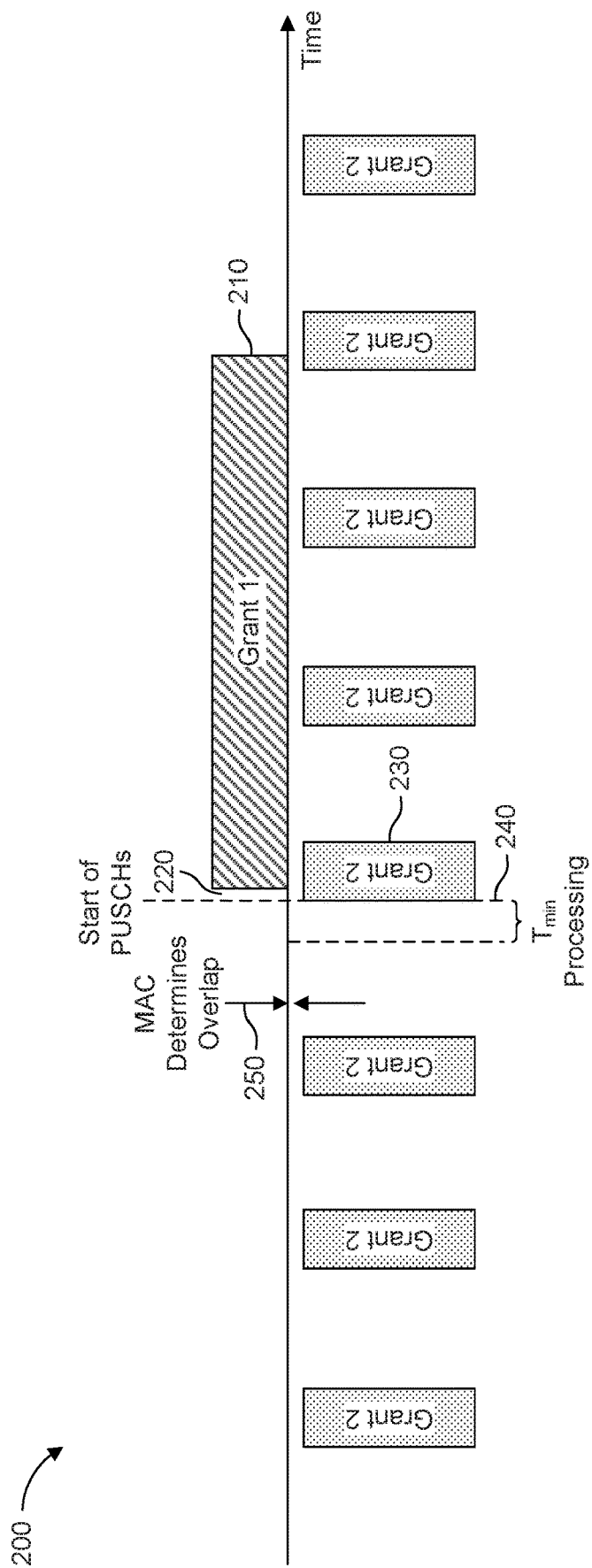
FIG. 2 is a signaling diagram illustrating an example case where the WTRU prioritizes and/or selects between grants in MAC.

FIG. 2 is a signaling diagram that illustrates an example scenario 200 where the WTRU prioritizes and/or selects between grants in MAC. In scenario 200, the WTRU determines, at time 250, that a transmission 210 for Grant 1 will begin at time 220, and that a transmission 230 for Grant 2 will overlap in the time domain with the transmission 210 and will begin before transmission 210, at time 240. In order to perform MAC layer prioritization of the two grants, the WTRU requires a minimum processing time $T_{min}$ to perform LCP. Because time 250 is before the start of $T_{min}$, the WTRU has sufficient time to prioritize the two grants and prioritizes the transmissions accordingly using MAC layer prioritization.

Figure 3:
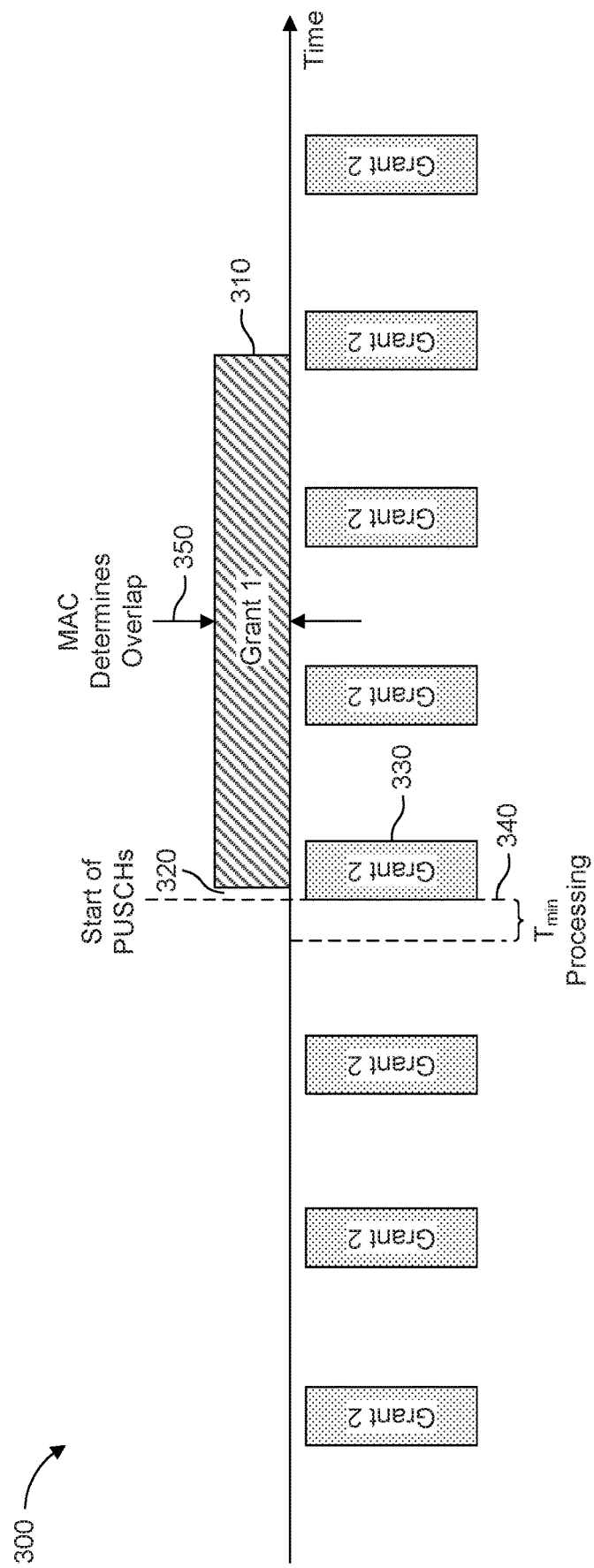
FIG. 3 is a signaling diagram illustrating an example case where the WTRU preempts an ongoing UL transmission.

FIG. 3 is a signaling diagram that illustrates an example scenario 300 where the WTRU preempts an ongoing UL transmission. In scenario 300, the WTRU determines, at time 350, that a transmission 310 for Grant 1 will begin at time 320, and that a transmission 330 for Grant 2 will overlap in the time domain with the transmission 310 and will begin before transmission 310, at time 340. In order to perform MAC layer prioritization of the two grants, the WTRU requires a minimum processing time $T_{min}$ to perform LCP. Because time 250 is after the start of $T_{min}$, the WTRU does not have sufficient time to prioritize the two grants and accordingly preempts the overlapping transmission on either Grant 1 or Grant 2 using physical layer preemption.

Figure 4:
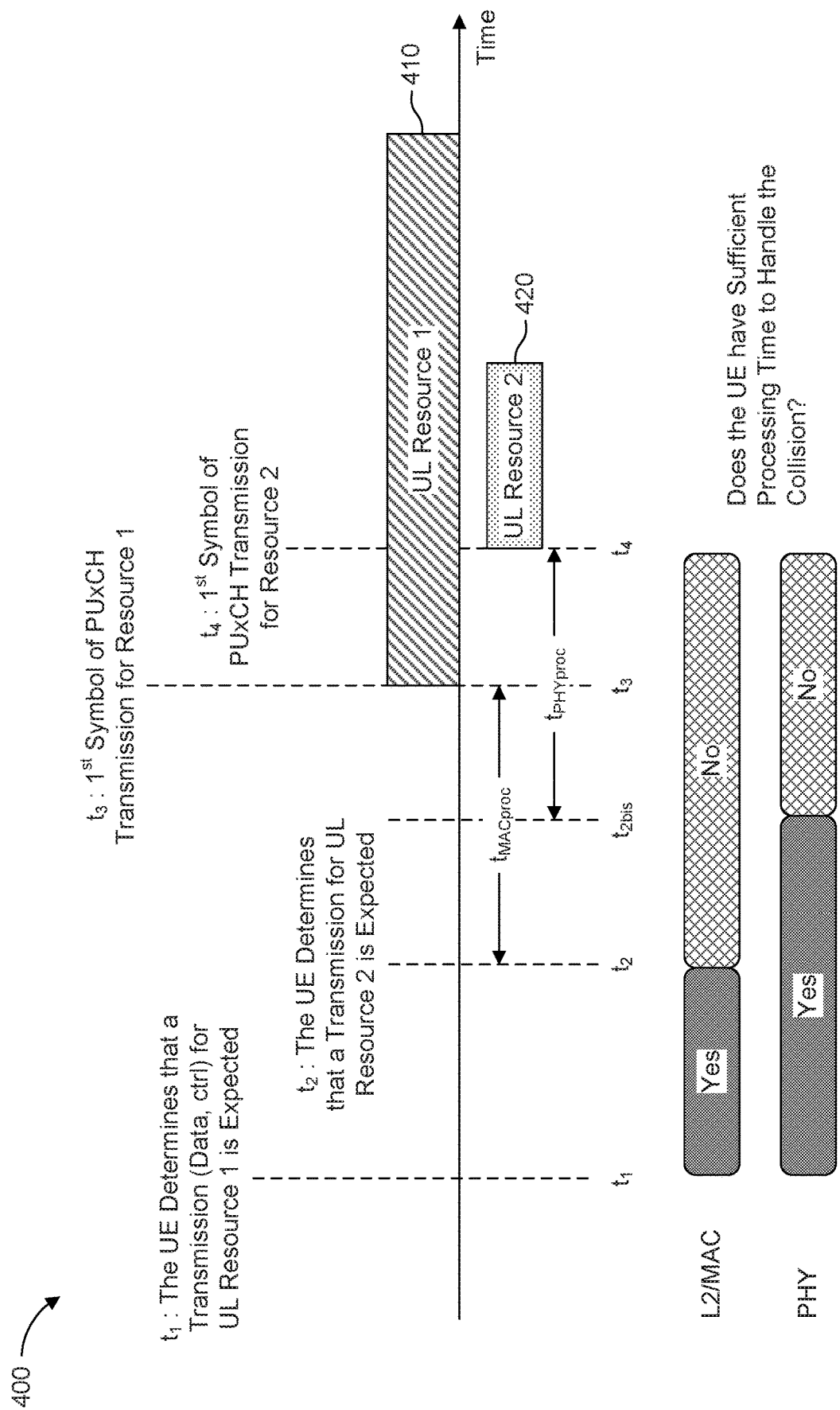
FIG. 4 is a signaling diagram illustrating a physical uplink channel transmission from a WTRU on a first uplink resource overlaps in the time domain with a physical uplink channel transmission from the WTRU on a second uplink resource.

FIG. 4 is a signaling diagram that illustrates an example scenario 400 where a physical uplink channel transmission 410 from a WTRU on a UL Resource 1 overlaps in the time domain with a physical uplink channel transmission 420 from the WTRU on a UL Resource 2. The first symbol of transmission 410 will begin at time $t_3$, and the first symbol of transmission 420 will begin later, at time $t_4$. In order for the WTRU to handle the overlap or "collision" between transmissions 410 and 420, the WTRU will need to detect the collision with sufficient lead time. In order for the WTRU to handle the overlap using MAC layer processing (e.g., by LCP) and/or generate a single transport block, the WTRU will need to detect the overlap a threshold time $t_{MACProc}$ before the beginning of the earlier overlapping transmission 410.

Accordingly, if the WTRU has already determined when transmission 410 will occur (e.g., at time $t_1$) and determines that the overlap with transmission 420 will occur at time $t_2$ or earlier (i.e., at least $t_{MACProc}$ before the earlier transmission 410), then the WTRU has enough processing time to handle the overlap using MAC layer processing (e.g., MAC layer prioritization).

On the other hand, if the WTRU has already determined when transmission 410 will occur (e.g., at time $t_1$) and determines that the overlap with transmission 420 will occur at time $t_{2bis}$ or earlier (i.e., at least $t_{PHYProc}$ before the beginning of the later transmission—which is the beginning of the overlap between transmission 410 and transmission 420), then the WTRU has enough processing time to handle the overlap using PHY layer processing (e.g., physical layer preemption).

Figure 5:
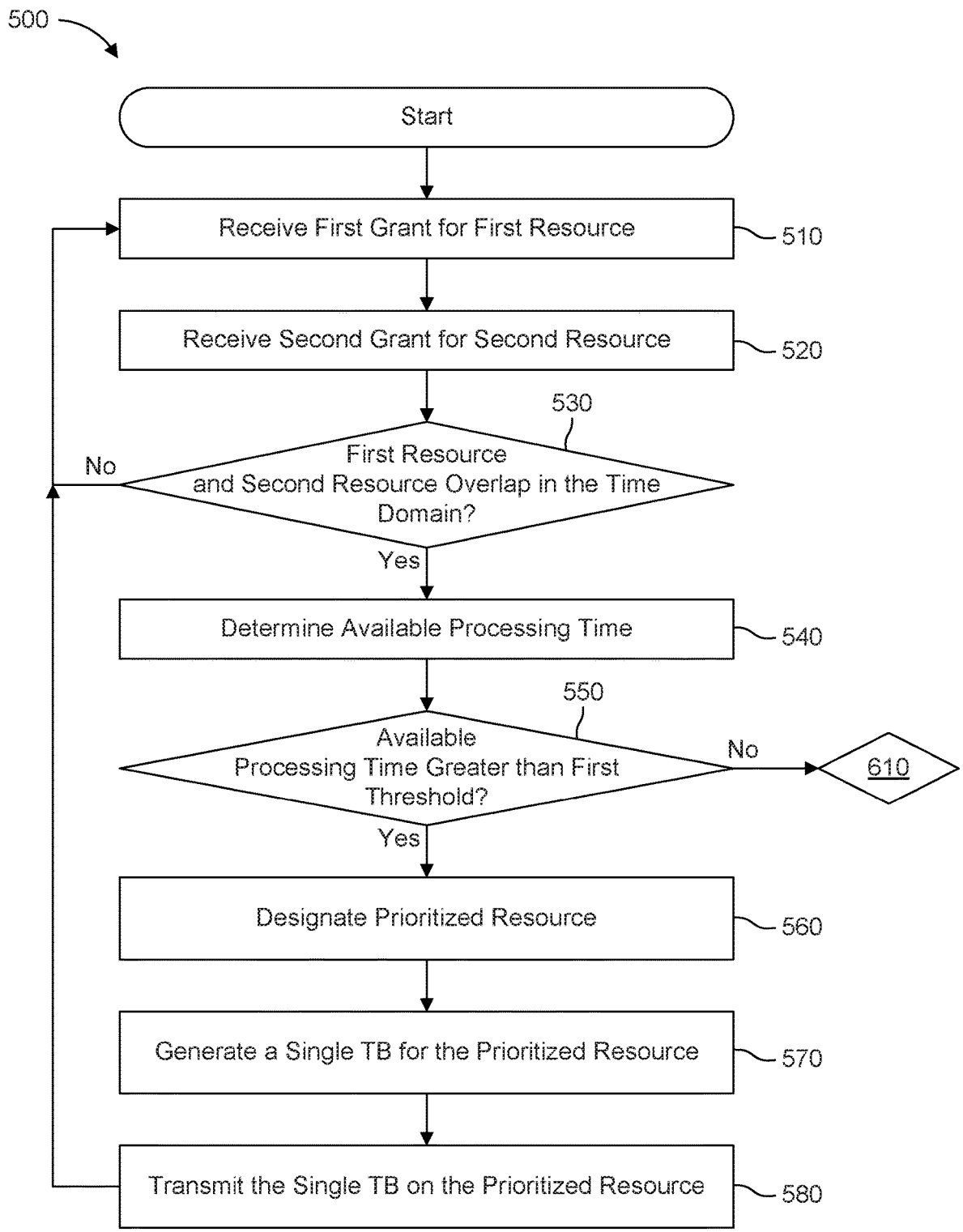
FIG. 5 is a flow chart illustrating an example method for handling overlapping transmissions on different resources.
Figure 6:
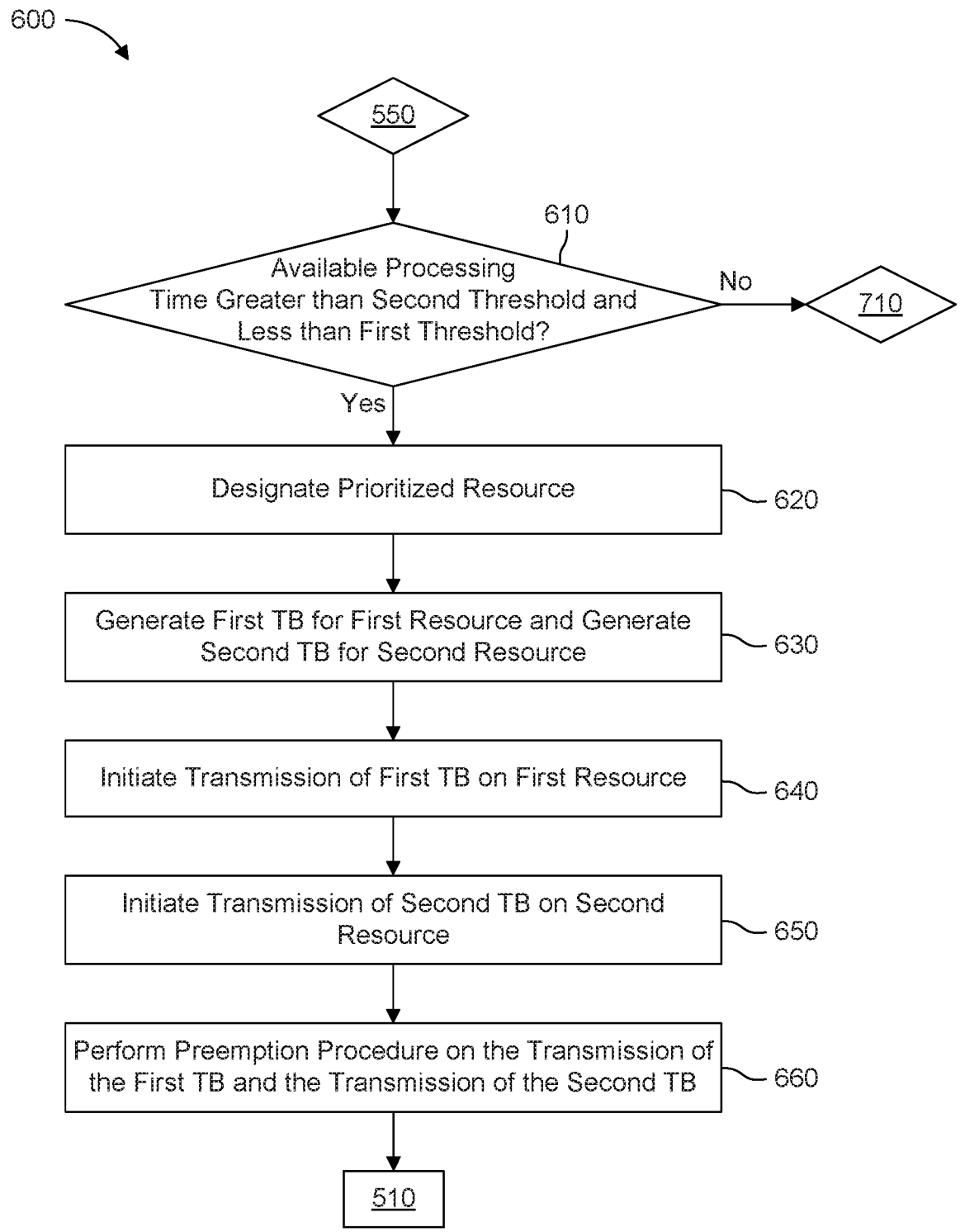
FIG. 6 is a flow chart further illustrating the example method of FIG. 5 for handling overlapping transmissions on different resources.
Figure 7:
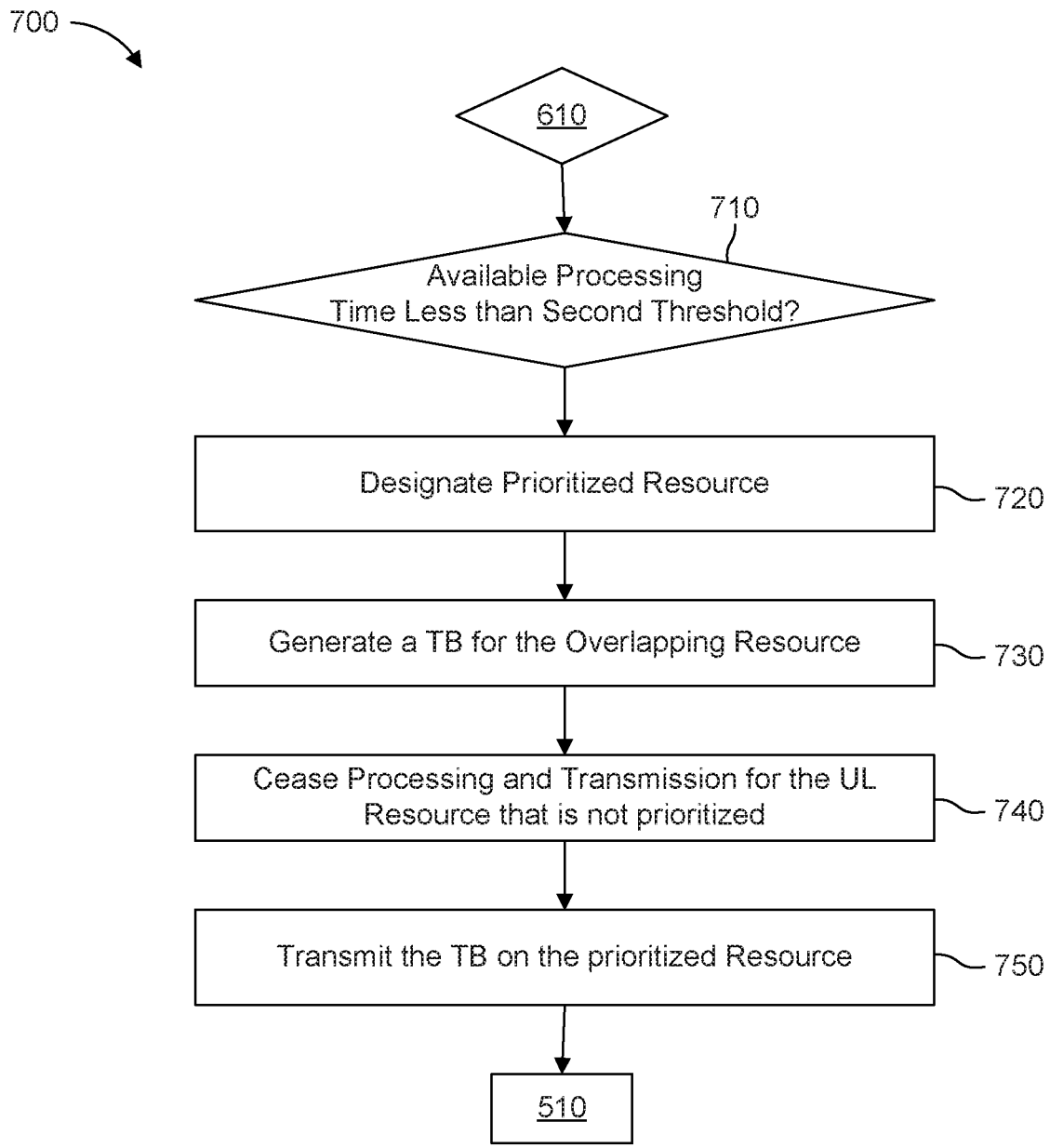
FIG. 7 is a flow chart further illustrating the example method of FIGS. 5 and 6 for handling overlapping transmissions on different resources.

FIGS. 5, 6, and 7 are flow charts illustrating an example method, which may be implemented in a WTRU, for handling overlap between a physical channel transmission on a first resource (e.g., a first grant) and a second physical channel transmission on a second resource (e.g., a second grant). It is noted that the order of steps is exemplary. In some embodiments, the steps may occur in a different order, may overlap in time, or some steps may be omitted. It is noted that the generation of a transport block (TB) in some steps is exemplary for the type of transmission on the uplink resource, and can be interchanged with UL control information or more generalized as an uplink transmission.

FIG. 5 is a flow chart 500 illustrating the example method for handling overlap described above. In step 510, the WTRU receives a first grant for a first resource, and in step 520, the WTRU receives a second grant for a second resource. The WTRU determines if and when a transmission on the first and second grants is expected. On condition 530 that a transmission on the first resource and a transmission on the second resource will overlap in the time domain, the WTRU determines available processing times in step 540; otherwise, the flow returns to step 510 where the WTRU receives another grant for a potentially overlapping set of resources. On condition 550 that the processing time is greater than a first threshold, the WTRU designates a prioritized resource at step 560, generates a single TB for the prioritized resource at step 570, and transmits the single TB on the prioritized resource at step 580. Otherwise, the flow continues to step 610 as shown and described with respect to FIG. 6.

In step 540, the WTRU determines both a first available processing time with respect to a first threshold and a second available processing time with respect to a second threshold, according to the various embodiments described above.

For example, the first available processing time with respect to the first threshold may be determined as the time remaining after the WTRU determines that a transmission on the second grant is expected (if the transmission on the second grant will occur later than the transmission on the first grant) and the start of the transmission on the first grant. This corresponds to the time between $t_2$ and $t_3$ as shown and described with respect to FIG. 4, in some embodiments.

The second available processing time with respect to the second threshold may be determined as the time remaining after the WTRU determines that a transmission on the second grant is ex after the WTRU determines that a transmission on the second grant is expected (assuming that the transmission on the second grant will occur later than the transmission on the first grant) and the start of the transmission on the second grant (i.e., the start of the overlap between the transmissions). This corresponds to the time between $t_2$ and $t_4$ as shown and described with respect to FIG. 4, in some embodiments.

In condition 550, the WTRU compares the first available processing time with a first threshold to determine whether there is enough processing time remaining for the WTRU to determine which transmission of the two should be prioritized, using MAC layer prioritization. This threshold corresponds to $t_{MACProc}$, as shown and described with respect to FIG. 4.

It is noted various steps and conditions represent one example embodiment only, and are shown separately and in a particular for ease of illustration and understanding only. The various steps and conditions do not necessarily consecutive or separate operations. For example, the first and second grant received in steps 510 and 520 respectively can be received simultaneously in some embodiments, or in the reverse of the order shown.

The example method is described using flow charts 500, 600, and 700 in combination, as shown and described with respect to FIGS. 5, 6, and 7 respectively. However, it is noted that the method of flow chart 500 can also be conceptualized as a method for MAC layer prioritization on its own, in which case, the negative condition of condition 550 would return to step 510 in some embodiments.

FIG. 6 is a flow chart 600 further illustrating the example method for handling overlap described above. The flow proceeds to condition 610 from condition 550 as shown and described with respect to FIG. 5. On condition 610 that the first available processing time is less than the first threshold, but the second available processing time is greater than a second threshold, the WTRU designates a prioritized resource at step 620, generates a first TB for the first resource and a second TB for the second resource at step 630, initiates a transmission of the first TB on the first resource at step 640, initiates a transmission of the second TB on the second resource at step 650, and performs a preemption procedure (in the PHY layer) on the transmissions of the first TB and second TB at step 660. Otherwise, the flow continues to step 710 as shown and described with respect to FIG. 7. It is noted that the order of the various processing steps 630, 640, and 650 is exemplary, and may occur in any suitable order, and/or overlap in time, or be simultaneous in other embodiments. It is noted that the generation of a transport block (TB) in some steps is exemplary for the type of transmission on the uplink resource, and can be interchanged with UL control information or more generalized as an uplink transmission.

In condition 610, the WTRU compares the second available processing time (i.e., as determined in step 540, shown and described with respect to FIG. 5) with a second threshold to determine whether there is enough processing time remaining for the WTRU to determine which transmission of the two should be prioritized, using PHY layer prioritization. This threshold corresponds to $t_{PHYProc}$, as shown and described with respect to FIG. 4.

FIG. 7 is a flow chart 700 further illustrating the method for handling overlap described above. The flow proceeds to condition 710 from condition 610 as shown and described with respect to FIG. 6. On condition 710 that the second available processing time is less than the second threshold, the WTRU designates a prioritized resource at step 720, generates a single TB for the resource on which the prioritized transmission is performed at step 730, ceases processing and transmission for the UL resource that is not prioritized at step 740 and transmits the single TB on the prioritized resource at step 750. It is noted that the order of the various processing steps 730, 740, and 750 is exemplary, and may occur in any suitable order, and/or overlap in time, or be simultaneous in other embodiments. It is noted that the generation of a transport block (TB) in some steps is exemplary for the type of transmission on the uplink resource, and can be interchanged with UL control information or more generalized as an uplink transmission. The flow returns to step 510 as shown and described with respect to FIG. 5.

In the example processing order shown in FIGS. 5, 6, and 7, condition 710 is an implied condition; i.e., the second available processing time will always be less than the second threshold if processing reaches condition 710 (i.e., there is no negative condition). It is noted however that this processing order is only exemplary. In other implementations, the WTRU may determine this condition earlier than condition 610 and/or 550, in which case the negative condition would advance the flow to the next appropriate condition (e.g., condition 610 or 550) accordingly.

In some implementations, preemption may include the WTRU stopping a first ongoing transmission (e.g., corresponding to a first grant) to start a second transmission (e.g., corresponding to a second grant). In some implementations, the WTRU may determine whether or not a grant should be considered as overlapping with another grant as a function of the data available in the buffer of the WTRU for the applicable LCH (e.g., if there is non-zero and/or more than a specific amount of data available for transmission for those LCHs). Such determination may be based on LCH mapping restrictions and/or based on a determination of the applicable TP for the TB associated with a given grant.

In some implementations, a WTRU may determine that a first grant overlaps in time and/or resources with a second grant, but that the available processing resources (e.g., time) are insufficient to complete the processing of the second grant before the start of the transmission corresponding to the first grant, before the transmission corresponding to the first grant has already started, and/or before at least one TB of the transmission corresponding to the first grant has already been delivered to the physical layer. In this case, the WTRU may perform a transmission over the second grant and may preempt the transmission associated with the first grant, depending on data available for transmission and properties of the first and second grants.

More specifically, in some implementations, the WTRU may preempt a transmission associated with the first grant in cases where at least one of the following example conditions occur.

In a first example, the WTRU may preempt a transmission associated with the first grant in cases where the WTRU has data available for transmission that may be transmitted over the second grant according to logical channel restrictions and/or TP. In some implementations, an additional condition is that such data cannot be transmitted over the first grant according to such restrictions and/or TP.

In a second example, the WTRU may preempt a transmission associated with the first grant in cases where the resources of the first and second grant overlap (completely or partially) in the time domain, but do not overlap, or do not completely overlap, in the frequency domain. In some implementations, such condition may be configurable by higher layers.

In a third example, the WTRU may preempt a transmission associated with the first grant in cases where a priority parameter associated with the data available for transmission is higher than any priority parameter associated with the data included in a transport block carried by the transmission corresponding to the first grant. In some implementations, such priority parameter may include a logical channel priority used, e.g., as part of an LCP procedure, or may include a preemption priority. In some implementations, such preemption priority may be configured by higher layers for each logical channel or logical channel group independently of the logical channel priority.

In a fourth example, the WTRU may preempt a transmission associated with the first grant in cases where a priority parameter (e.g., a preemption parameter) associated with the second grant is higher than a priority parameter associated with the first grant. In some implementations, such priority parameter may be configured for each grant, e.g., as part of a TP, or explicitly signaled in DCI or by RRC. In some implementations, the priority parameter may be determined implicitly based on a property of the grant.

In a fifth example, the WTRU may preempt a transmission associated with the earliest occurring grant in cases where the HARQ processes corresponding to the first and second grants are not the same. In such cases, if the earliest occurring grant also overlaps with a third grant (e.g., later in time) the WTRU may still perform a transmission over a third grant if other applicable conditions are satisfied.

In a sixth example, the WTRU may preempt a transmission associated with the first grant in cases where the PUSCH duration corresponding to the first and second grants is different. For example, the WTRU may preempt the transmission of the first grant if the PUSCH duration of the second grant is shorter than a certain configured value (in some examples, such value may depend on the maximum PUSCH duration LCP restriction configured for the highest priority LCH with buffered data or a semi-statically configured value), the PUSCH duration of the second grant is shorter than a certain relative value (e.g., is smaller than the PUSCH duration of the first grant or the remaining PUSCH duration of the first grant), and/or the remaining time to complete the first transmission (on the first grant) is greater than a certain value.

In a seventh example, the WTRU may preempt a transmission associated with the first grant in cases where one of the selection methods described in the above paragraphs, applied to the first and second grant, would result in selecting the second grant. In other words, the conditions described above for grant prioritization can also be applied as conditions for preemption (e.g., based on processing time, grant priority, QoS, and so forth.

In some cases, such as some implementations of the above cases, if the WTRU preempts a transmission associated with the first grant (i.e., the "preempted transmission") to perform a transmission associated with the second grant (i.e., the "preempting transmission") one or more of the following may occur: the preempted transmission may be interrupted or cancelled at or before the start of the preempting transmission; the preempted transmission may resume at or after the end of the preempting transmission; in cases where the HARQ process of the preempted and preempting transmission are the same, the HARQ process of the preempted transmission may be flushed; and/or the WTRU may generate a CBG-based retransmission for the preempted code block groups (in such cases, in some implementations, the WTRU may thus later receive a later grant with a TBS smaller than the total TB size of the initial transmission. The WTRU may provide the indices of the preempted CBGs on the first grant part of the second grant or on the uplink control channel).

Some examples relate to HARQ process selection. In some implementations, in cases where the second grant is a configured grant, the WTRU may identify a HARQ process associated with the configured grant. In some implementations, the WTRU may determine the HARQ process based on a pre-defined formula (e.g., based on the resources occupied by the grant). In some implementations, the WTRU may determine that the HARQ process would be the same as the HARQ process associated with another grant (e.g., a previous overlapping first grant). To prevent overwriting of data in the HARQ process of the first grant, the WTRU may determine (e.g., re-select) a HARQ process (i.e., a HARQ process ID other than the one autonomously determined by the WTRU based on the pre-defined formula) based on at least one of the following example approaches. In a first example approach, the WTRU selects a HARQ process for which a configured grant timer is not running. For example, the WTRU may cycle through available HARQ processes, e.g., starting from the one initially determined, until it finds one for which the configured grant timer is not running. If no such HARQ process can be found, the WTRU may select the HARQ process for which the timer has been running the longest. In a second example approach, the WTRU selects a HARQ process that is not associated with any on-going transmissions.

After receiving a dynamic grant which overlaps, in the time domain, with a configured grant, the WTRU may perform one or more of several actions. In a first example action, the WTRU may stop the configured grant timer associated with the overlapping configured grant. For example, if the WTRU determines that the configured grant is prioritized over the dynamic grant, the WTRU may stop the configured grant timer if it is running. In a second example action, the WTRU may start the configured grant timer, e.g., if the dynamic grant is prioritized over the configured grant. In a third example action, the WTRU may perform the first or section example actions conditionally, if the overlapping grants have the same HARQ process ID.

In some implementations, the WTRU may have multiple active configured grants. Depending on the resource configuration aspects of the configured grants, more than one configured grant may overlap in time. The WTRU may determine that a HARQ process ID of the configured grant for a certain occasion (i.e., a configured grant occasion; e.g., a time or slot in which the configured grant resource is scheduled for possible transmission) is based on a predefined formula (e.g., a formula based on the resources occupied by the grant). If multiple active configured grants overlap in a given occasion for a configured grant transmission, the WTRU may determine the HARQ process ID based on the selected active configured grant. For example, for a given occasion, the WTRU may select different HARQ process IDs for different configured grants, e.g., by including a configured grant index or offset in the formula used to determine the HARQ process ID.

Some examples relate to selection and/or prioritization between multiple active configured grants. In some implementations the WTRU may have multiple active configured grants. Depending on the resource configuration aspects, more than one configured grant may overlap in time. The WTRU may need to prioritize or select between the overlapping configured grants. Such prioritization or selection may be made by the WTRU based, e.g., on one or more conditions.

In a first example condition, the prioritization or selection is made based on the highest priority of data available for transmission. For example, WTRU may select the configured grant on which highest priority data can be transmitted. The priority may be based on the LCH priority configured for LCP.

In a second example condition, the prioritization or selection is made based on a configured service index and/or TP. For example, one or more TPs can be configured per configured grant and per LCH. The WTRU may select the configured grant which has a TP that matches at least one TP configured for the highest priority LCH for which buffered data for transmission is available.

In a third example condition, the prioritization or selection is made based on the LCP restrictions of the highest priority LCH for which buffered data for transmission is available. For example, the WTRU may prioritize the configured grant or grants meeting LCP LCH selection restrictions of the highest priority LCH with buffered data for transmission.

In a fourth example condition, the prioritization or selection is made based on a property of the configured grant. Example properties may include the type of configured grant (e.g., NR type 1 or type 2); the periodicity of the configured grant (e.g., the WTRU selects the configured grant of the shortest configured periodicity); the PUSCH duration of the configured grant (e.g., the WTRU selects the configured grant of the shortest PUSCH duration, where such duration may include e.g., the total duration including repetitions (K)); the value configured for the configured grant timer for each grant; (e.g., the WTRU selects the configured grant of the shortest configured grant timer); the MCS table of the configured table (e.g., the WTRU selects the configured grant with MCS table corresponding to lowest spectral efficiency); and/or the configured number of repetitions (K) (e.g., the WTRU selects the configured grant with the smallest number of repetitions. In cases where at least one repetition of a first configured grant does not overlap with the second configured grant, the WTRU may e.g., use the first configured grant for the at least one repetition).

In a fifth example condition, the prioritization or selection is made based on measurements performed related to a configured grant. For example, the WTRU may select a configured grant on a certain BWP based on the measurements performed on that BWP. The WTRU may select the configured grant with the best metric (including but not limited to RSRP, RSRQ, RSSI, and/or channel occupancy).

In a sixth example condition, the prioritization or selection is made based on whether the transmission is an initial transmission or a re-transmission, e.g., including the retransmission number or the revision number. In a seventh example condition, the prioritization or selection is made based on the cell or bandwidth part on which the configured grant resources are located. In other examples, the prioritization or selection can be made based on a combination of these, and/or other conditions.

In some implementations, the WTRU may consider certain configured grants as deactivated. In some implementations, the WTRU may consider certain configured grants as deactivated even if they are configured in the active bandwidth part, e.g., depending on the periodicity of the configured grant, the active traffic/service profile, and/or LCP restrictions for LCH(s) having buffered data that maps to configured grants. For example, if a certain TP is configured for a configured grant, the WTRU may consider only the configured grants with a TP matching that of LCH(s) with buffered data for transmission as active configured grants. In another example, the WTRU may consider only the configured grants with configured periodicities matching the packet delay budgets of LCH(s) with buffered data for transmission as active configured grants.

In some implementations, grant prioritization can impact the MAC and higher layers. For example, if the MAC constructs a TB that is either not transmitted, not delivered to the physical layer for transmission, or preempted after the start of its PUSCH transmission duration, there may an impact on higher layers related to the inclusion of control elements and related timers and counters. More generally, when a TB is cancelled or not transmitted in MAC, MAC may consider performing one or more actions, such as the following example actions.

In a first example, if a cancelled MAC PDU (e.g., a preempted transmission) includes certain MAC CEs, the WTRU may regenerate the MAC CEs in the later grant. MAC CEs may include, but not limited to, C-RNTI MAC CE, BSR MAC CE, and Power Headroom (PHR) MAC CE. For example, the MAC entity may generate all or a subset of the MAC CEs that were included in the first grant part of the MAC PDU of the second grant, and such may be considered in MAC in advance of the preemption event (or without knowledge of whether PHY will preempt the first TB). The MAC may consider such regeneration of MAC CEs if the second grant overlaps in resources with the first grant.

In a second example, if certain timers or actions were modified/carried in MAC as a result of the inclusion of MAC CEs in the cancelled MAC PDU (e.g. the first grant/preempted grant), MAC may reset or undo such actions. For a timer started as a result of an inclusion of a MAC CE in a preempted grant, MAC may stop or restart such timer. For example, if the second TB included the same MAC CE, MAC may restart the related timer; and/or if the second TB did not include the same MAC CE, MAC may stop the related timer.

In a third example, if a BSR MAC CE was included in a preempted MAC PDU and the BSR timers (e.g., periodicBSR-Timer and retxBSR-Timer) were started as a result of the inclusion, MAC may stop these timers upon determining that relevant MAC PDU has been, or will be, preempted. MAC may further re-trigger BSR(s) cancelled by MAC as a result of inclusion of the BSR MAC CE in the cancelled MAC PDU, e.g. in order to include another BSR MAC CE in the second/later grant.

In a fourth example, if a PHR MAC CE was included in a preempted MAC PDU and the PHR timers (e.g. phr-ProhibitTimer and phr-PeriodicTimer) were started as a result of the inclusion, MAC may stop these timers upon determining that relevant MAC PDU has been—or will be—preempted. MAC may further re-trigger PHR(s) cancelled by MAC as a result of inclusion of the PHR MAC CE in the cancelled MAC PDU, e.g. in order to include another PHR MAC CE in the second/later grant.

In a fifth example, If a certain counter was incremented or modified as a result of the inclusion of MAC CEs in the cancelled MAC PDU (e.g. the first grant/preempted grant), MAC may decrement the counter to restore its value, or may reset the counter.

These example actions (or other actions) may be more generally performed by MAC for cases where a TB was cancelled or not transmitted, and may be further conditioned on the priority of the MAC CE or the priority of the LCH that triggered the inclusion of the MAC CE.

Some approaches relate to discontinuous reception (DRX). For example, the DRX procedure may be enhanced to provide different power saving opportunities for the WTRU, e.g., as a function of the type of traffic. In some examples, additional DRX timers can be utilized when grants or assignments indicating one of a plurality of types of MCS table (or using more than one RNTI, such as a C-RNTI and a new-RNTI) can be received. Such additional DRX timers may be started or stopped based on conditions similar to those for starting or stopping existing DRX timers, e.g., with the further condition that the grants or assignments indicate a first type of MCS table (or use a first RNTI, such as a new-RNTI). In some examples, existing DRX timers may be started or stopped with the further condition that the grants or assignments indicate a second type of MCS table (or use a second RNTI, such as a C-RNTI).

In some examples, a new timer (e.g., drx-HARQ-RTT-TimerUL-UR, the minimum duration before a UL HARQ retransmission grant is expected by the MAC entity) may be started only if a PDCCH indicates a UL transmission indicating a first type of MCS table, or a MAC PDU is transmitted in a configured uplink grant associated with a first type of MCS table. A new timer (e.g., drx-RetransmissionTimerUL-UR, the maximum duration until a grant for UL retransmission is received) may be stopped under the same condition. In some examples, the first type of MCS table may correspond to so-called ultra-reliable communications (e.g., URLLC). Accordingly, in the examples herein, the active time and various timers are indicated as pertaining to ultra-reliable communications (UR) however it is noted that these techniques can be applied to any desired type of MCS table in other examples. In some examples, an existing timer (e.g., drx-HARQ-RTT-TimerUL) may be started only if a PDCCH indicates a UL transmission indicating a second type of MCS table, or a MAC PDU is transmitted in a configured uplink grant associated with a second type of MCS table. An existing timer (e.g., drx-RetransmissionTimerUL) may be stopped under the same condition. In some examples, a new timer (e.g., drx-InactivityTimer-UR) may be started only if a PDCCH indicates a new transmission associated with a first type of MCS table. In some examples, a new timer (e.g., drx-RetransmissionTimerUL) may be started upon expiration of new timer (e.g., drx-HARQ-RTT-Timer-UL-UR).

Similar behavior may apply for corresponding DL timers. In some examples, a common active time is used for all types of MCS tables or RNTI. In such cases the active time may also include a time when some of the newly defined timers are running, such as when drx-InactivityTimer-UR (the duration after the PDCCH occasion in which a PDCCH indicates a new UL or DL transmission for the MAC entity), drx-RetransmissionTimerDL-UR (the maximum duration until a DL retransmission is received), or drx-RetransmissionTimerUL-UR or drx-onDurationTimer-UR (the duration at the beginning of a DRX Cycle) are running. Alternatively, in some examples, active time may be defined with respect to a certain type of MCS table of RNTI, or set thereof. Multiple types of active time may be defined, each of which may govern when the WTRU monitors PDCCH for a certain set of type(s) of MCS table (e.g., a UR MCS) or RNTI(s).

For example, an Active Time UR may include the time while at least one of drx-onDurationTimer-UR or drx-InactivityTimer-UR or drx-RetransmissionTimerDL-UR or drx-RetransmissionTimerUL-UR or ra-ContentionResolutionTimer-UR is running. During Active Time UR, the WTRU may monitor PDCCH for a first type of MCS tables only, or for a first RNTI (such as new-RNTI) only. Alternatively, the WTRU may monitor PDCCH irrespective of the type of MCS table or RNTI. During active time, the WTRU may monitor PDCCH for a second type of MCS tables only, or for a second RNTI (such as C-RNTI) only. Alternatively, the WTRU may monitor PDCCH irrespective of the type of MCS table or RNTI.

Some approaches relate to search space configuration. For example, a WTRU may be configured to monitor PDCCH using a first set of DCI formats (or DCI sizes) with a first RNTI (e.g., a C-RNTI) and a second set of DCI formats (or DCI sizes) with a second RNTI (e.g., a new-RNTI). In some examples, a WTRU may be configured to monitor PDCCH on a specific search space or coreset using a certain set of RNTI(s). The set of RNTI(s) may be signaled by RRC. For example, a UE may be configured to monitor PDCCH only for new-RNTI in a first coreset or search space, and configured to monitor PDCCH for both C-RNTI and new-RNTI in a second coreset or search space.

In some examples, the set of RNTI(s) may be determined from the monitoring periodicity of the search space. For example, for a monitoring periodicity $k<k_{thr}$, the WTRU may monitor new-RNTI and for higher periodicity, the WTRU may monitor C-RNTI (or both new-RNTI and C-RNTI). Here, $k_{thr}$ is a threshold with which the WTRU is configured. Stated another way, if the periodicity of the search space is less than $k_{thr}$, the WTRU monitors for a first RNTI or uses a first MCS table, otherwise, it monitors for a second RNTI or uses a second MCS table. In some examples, the set of RNTI(s) may be determined from the Symbol Within Slot (i.e., determines the C-RNTI from the symbol number within the slot for a PUSCH transmission). For example, first N symbols can be linked to C-RNTI and the remaining symbols of slot can be linked to new-RNTI. In some examples, the set of RNTI(s) may be determined from the aggregation level. In some examples, if the New RNTI is used with same DCI size, the interpretation of the DCI fields may depend on the RNTI used. This may allow a reduction of the false alarm rate.

Some examples relate to time domain allocation of PDSCH/PUSCH. In some examples, the time domain allocation for URLLC points to different table. Some examples relate to HARQ feedback timing indication. In some examples, the set of K1 value are different between URLLC/eMBB. In some examples, unused fields may be reused to decrease the false alarm rate. For example, since the URLLC packet is expected to have small size, CBG may not be used even if the cell is configured with CBG based transmission. In this case, CBGTI/CBGFI fields in DCI can be set to special values.

It is noted that K1 refers to the delay between DL data (PDSCH) reception and a corresponding ACK transmission on UL. K2 refers to the delay between UL grant reception in DL and UL data (PUSCH) transmission. The set of K2 values may be different between URLLC/eMBB, e.g., for different RNTI values. N1 refers to the number of OFDM symbols required for WTRU processing from the end of NR-PDSCH reception to the earliest possible start of the corresponding ACK/NACK transmission from the WTRU perspective. The set of N1 values may be different between URLLC/eMBB e.g., for different RNTI values. N2 refers to the number of OFDM symbols required for WTRU processing from the end of NR-PDCCH containing the UL grant reception to the earliest possible start of the corresponding NR-PUSCH transmission from WTRU perspective. The set of N2 values may be different between URLLC/eMBB, e.g., for different RNTI values.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
   receiver circuitry configured to receive a configured grant (CG) and a dynamic grant (DG); and
   processor circuitry configured to:
      determine that a transmission corresponding to the CG and a transmission corresponding to the DG are scheduled to overlap in time;
      preempt the transmission corresponding to the DG on a condition that a priority associated with the transmission corresponding to the CG is higher than a priority associated with the transmission corresponding to the DG, and
      preempt the transmission corresponding to the CG on a condition that the priority associated with the transmission corresponding to the CG is lower than the priority associated with the transmission corresponding to the DG and that a processing time associated with the transmission corresponding to the DG is greater than a threshold that is based on a capability of the WTRU.

2. The WTRU of claim 1, wherein the receiver circuitry is further configured to receive a priority indicator indicating the priority associated with the transmission corresponding to the CG.

3. The WTRU of claim 1, wherein the receiver circuitry is configured to receive the DG in a physical downlink control channel (PDCCH) transmission.

4. The WTRU of claim 1, wherein the transmission corresponding to the CG and the transmission corresponding to the DG overlap in physical resources.

5. The WTRU of claim 1, wherein the transmission corresponding to the CG comprises a physical uplink shared channel (PUSCH) transmission.

6. The WTRU of claim 1, wherein the transmission corresponding to the DG comprises a physical uplink shared channel (PUSCH) transmission.

7. The WTRU of claim 1, wherein the threshold corresponds to a threshold number of symbols.

8. The WTRU of claim 1, wherein the transmission corresponding to DG is associated with a second start time, and wherein the processing time comprises an amount of time between the reception of the DG and the start time.

9. The WTRU of claim 1, wherein the processor circuitry being configured to preempt the transmission corresponding to the DG comprises the processor circuitry being configured to cancel the transmission corresponding to the DG, and the processor circuitry being configured to preempt the transmission corresponding to the CG comprises the processor circuitry being configured to cancel the transmission corresponding to the CG.

10. A wireless transmit/receive unit (WTRU) comprising a processor and memory, the processor and memory configured to:
   receive a configured grant (CG) and a first dynamic grant (DG), wherein a first transmission corresponding to the CG and a transmission corresponding to the first DG are scheduled to overlap in time;
   preempt the transmission corresponding to the first DG based on a priority associated with the first transmission corresponding to the CG being higher than a priority associated with the transmission corresponding to the first DG;
   receive a second DG, wherein a second transmission corresponding to the CG and a transmission corresponding to the second DG are scheduled to overlap in time; and
   preempt the second transmission corresponding to the CG based on a priority associated with the second transmission corresponding to the CG being lower than a priority associated with the transmission corresponding to the second DG and based on a processing time associated with the transmission corresponding to the second DG being greater than a threshold that is based on a capability of the WTRU.

11. The WTRU of claim 10, wherein the processor and memory being configured to preempt the transmission corresponding to the first DG comprises the processor and memory being configured to not transmit the transmission corresponding to the first DG, and the processor and memory being configured to preempt the second transmission corresponding to the CG comprises the processor and memory being configured to not transmit the second transmission corresponding to the CG.

12. The WTRU of claim 10, wherein the processor and memory are further configured to receive at least one of a first priority indicator indicating the priority associated with the first transmission corresponding to the CG and a second priority indicator indicating the priority associated with the second transmission corresponding to the CG.

13. The WTRU of claim 10, wherein the processor and memory are configured to receive the first DG in a physical downlink control channel (PDCCH) transmission.

14. The WTRU of claim 10, wherein the first transmission corresponding to the CG and the transmission corresponding to the first DG overlap in physical resources, and wherein the second transmission corresponding to the CG and the transmission corresponding to the second DG overlap in physical resources.

15. The WTRU of claim 10, wherein the transmission corresponding to the first DG comprises a first physical uplink shared channel (PUSCH) transmission, and wherein the transmission corresponding to the second DG comprises a second PUSCH transmission.

16. A method implemented in a wireless transmit/receive unit (WTRU), the method comprising:
receiving a configured grant (CG) and a first dynamic grant (DG), wherein a first transmission corresponding to the CG and a transmission corresponding to the first DG are scheduled to overlap in time;
preempting the transmission corresponding to the first DG based on a priority associated with the first transmission corresponding to the CG being higher than a priority associated with the transmission corresponding to the first DG;
receiving a second DG, wherein a second transmission corresponding to the CG and a transmission corresponding to the second DG are scheduled to overlap in time; and
preempting the second transmission corresponding to the CG based on a priority associated with the second transmission corresponding to the CG being lower than a priority associated with the transmission corresponding to the second DG and based on a processing time associated with the transmission corresponding to the second DG being greater than a threshold that is based on a capability of the WTRU.

17. The method of claim 16, wherein preempting the transmission corresponding to the first DG comprises not transmitting the transmission corresponding to the first DG, and preempting the second transmission corresponding to the CG comprises not transmitting the second transmission corresponding to the CG.

18. The method of claim 16, further comprising receiving at least one of a first priority indicator indicating the priority associated with the first transmission corresponding to the CG and a second priority indicator indicating the priority associated with the second transmission corresponding to the CG.

19. The method of claim 16, wherein the first transmission corresponding to the CG and the transmission corresponding to the first DG overlap in physical resources, and wherein the second transmission corresponding to the CG and the transmission corresponding to the second DG overlap in physical resources.

20. The method of claim 16, wherein the transmission corresponding to the first DG comprises a first physical uplink shared channel (PUSCH) transmission, and wherein the transmission corresponding to the second DG comprises a second PUSCH transmission.

* * * * *

UNITED STATES PATENT AND TRADEMARK OFFICE
CERTIFICATE OF CORRECTION

| | |
|---|---|
| PATENT NO. | : 11,758,554 B2 |
| APPLICATION NO. | : 17/253757 |
| DATED | : September 12, 2023 |
| INVENTOR(S) | : Ghyslain Pelletier et al. |

It is certified that error appears in the above-identified patent and that said Letters Patent is hereby corrected as shown below:

In the Claims

In Claim 8: Column 44, Line 24, delete "with a second start" and insert -- with a start --.

Signed and Sealed this
Twenty-sixth Day of December, 2023

Katherine Kelly Vidal
*Director of the United States Patent and Trademark Office*